(12) United States Patent
Cui et al.

(10) Patent No.: US 9,380,646 B2
(45) Date of Patent: Jun. 28, 2016

(54) NETWORK SELECTION ARCHITECTURE

(71) Applicant: AT&T INTELLECTUAL PROPERTY I, L.P., Atlanta, GA (US)

(72) Inventors: Zhi Cui, Sugar Hill, GA (US); Alan Blackburn, Woodstock, GA (US); Hany Fahmy, Duluth, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 38 days.

(21) Appl. No.: 14/035,584

(22) Filed: Sep. 24, 2013

(65) Prior Publication Data

US 2015/0085650 A1   Mar. 26, 2015

(51) Int. Cl.
| | |
|---|---|
| *H04W 92/02* | (2009.01) |
| *H04W 28/08* | (2009.01) |
| *H04W 48/00* | (2009.01) |

(52) U.S. Cl.
CPC .............. *H04W 92/02* (2013.01); *H04W 28/08* (2013.01); *H04W 48/00* (2013.01)

(58) Field of Classification Search
None
See application file for complete search history.

(56) References Cited

U.S. PATENT DOCUMENTS

| | | | |
|---|---|---|---|
| 5,953,677 | A | 9/1999 | Sato |
| 6,314,308 | B1 | 11/2001 | Sheynblat et al. |
| 6,430,168 | B1 | 8/2002 | Djurkovic et al. |
| 6,628,946 | B1 | 9/2003 | Wiberg et al. |
| 7,082,305 | B2 | 7/2006 | Willars et al. |
| 7,116,970 | B2 | 10/2006 | Brusilovsky et al. |
| 7,146,130 | B2 | 12/2006 | Hsu et al. |
| 7,299,019 | B1 | 11/2007 | Austin et al. |
| 7,400,600 | B2 | 7/2008 | Mullany et al. |
| 7,400,886 | B2 | 7/2008 | Sahim et al. |
| 7,440,755 | B2 | 10/2008 | Balachandran |
| 7,496,060 | B2 | 2/2009 | Ramirez et al. |
| 7,508,781 | B2 | 3/2009 | Liu et al. |
| 7,590,422 | B1 | 9/2009 | Chow et al. |
| 7,653,392 | B2 | 1/2010 | Ovadia et al. |

(Continued)

FOREIGN PATENT DOCUMENTS

| | | |
|---|---|---|
| AU | 2005320356 | 12/2005 |
| EP | 2244503 | 10/2010 |

(Continued)

OTHER PUBLICATIONS

Raza, Syed Numan, "LTE Performance Study," Master of Science Thesis, Feb. 9, 2012.

(Continued)

*Primary Examiner* — Alex Skripnikov
*Assistant Examiner* — Raza Ansari
(74) *Attorney, Agent, or Firm* — Hartman & Citrin LLC

(57) ABSTRACT

A user equipment device intelligent network selection architecture is provided that enables service provider policy driven dynamic intelligent network selection of a radio technology for user traffic delivery. The network selection is based on radio network conditions, user subscription profile, and device mobility state, including speed and movement pattern. Also provided are application program interfaces that allow access network discovery and selection function carrier clients decision as to communication with a connection manager or other lower layer functions. The architecture and associated application program interface enable automatic network selection and connection, which provides a consistent implementation across different device original equipment manufacturers and operating systems.

20 Claims, 10 Drawing Sheets

(56) References Cited

U.S. PATENT DOCUMENTS

| | | |
|---|---|---|
| 7,680,469 B2 | 3/2010 | Fry |
| 7,924,787 B2 | 4/2011 | Lee |
| 7,929,964 B2 | 4/2011 | Arumi et al. |
| 7,936,708 B2 | 5/2011 | Kesavan et al. |
| 7,983,713 B2 | 7/2011 | Sasse et al. |
| 8,045,980 B2 | 10/2011 | Buckley et al. |
| 8,068,843 B2 | 11/2011 | Yi et al. |
| 8,073,453 B2 | 12/2011 | Funnell |
| 8,121,090 B1 | 2/2012 | Dinan et al. |
| 8,121,607 B2 | 2/2012 | Fang et al. |
| 8,126,461 B2 | 2/2012 | Sengupta et al. |
| 8,212,661 B2 | 7/2012 | Shuster |
| 8,254,982 B2 | 8/2012 | Kuningas |
| 8,270,975 B2 | 9/2012 | Kim et al. |
| 8,270,991 B2 | 9/2012 | Zhao |
| 8,271,025 B2 | 9/2012 | Brisebois et al. |
| 8,279,831 B2 | 10/2012 | Sengupta et al. |
| 8,280,377 B2 | 10/2012 | Lee et al. |
| 8,305,970 B2 | 11/2012 | Park et al. |
| 8,325,661 B2 | 12/2012 | Montojo et al. |
| 8,331,228 B2 | 12/2012 | Huber et al. |
| 8,331,929 B2 | 12/2012 | Brisebois et al. |
| 8,364,156 B2 | 1/2013 | Chun et al. |
| 8,385,917 B2 | 2/2013 | Brisebois |
| 8,391,141 B2 | 3/2013 | Rune et al. |
| 8,391,238 B2 | 3/2013 | Rune et al. |
| 8,396,480 B2 | 3/2013 | Prytz et al. |
| 8,417,823 B2 | 4/2013 | Luna et al. |
| 8,467,786 B2 | 6/2013 | Salkintzis |
| 8,488,586 B2 | 7/2013 | Centonza et al. |
| 8,493,935 B2 | 7/2013 | Zisimopoulos |
| 8,510,801 B2 | 8/2013 | Majmundar et al. |
| 8,522,312 B2 | 8/2013 | Huber et al. |
| 8,649,291 B2 | 2/2014 | Wang et al. |
| 8,675,583 B2 | 3/2014 | Lee et al. |
| 8,885,613 B2 | 11/2014 | Sachs et al. |
| 2002/0123365 A1 | 9/2002 | Thorson et al. |
| 2003/0078075 A1 | 4/2003 | Mcnicol |
| 2003/0117953 A1 | 6/2003 | Kinahan et al. |
| 2004/0165538 A1* | 8/2004 | Swami ............... H04L 12/5602 370/252 |
| 2005/0227696 A1 | 10/2005 | Kaplan et al. |
| 2006/0128394 A1 | 6/2006 | Turina et al. |
| 2006/0166677 A1 | 7/2006 | Derakshan et al. |
| 2006/0199608 A1 | 9/2006 | Dunn et al. |
| 2007/0026854 A1 | 2/2007 | Nath |
| 2007/0091847 A1 | 4/2007 | Lee |
| 2007/0140163 A1 | 6/2007 | Meier et al. |
| 2007/0184835 A1 | 8/2007 | Bitran et al. |
| 2007/0253355 A1 | 11/2007 | Hande et al. |
| 2007/0286092 A1 | 12/2007 | Famolari et al. |
| 2008/0144577 A1 | 6/2008 | Huang et al. |
| 2008/0200146 A1 | 8/2008 | Wang et al. |
| 2009/0068970 A1 | 3/2009 | Ahmed et al. |
| 2009/0088160 A1 | 4/2009 | Pani et al. |
| 2009/0154423 A1 | 6/2009 | Song et al. |
| 2009/0164813 A1 | 6/2009 | Tu et al. |
| 2009/0209263 A1 | 8/2009 | Breuer et al. |
| 2009/0252059 A1 | 10/2009 | Vigue et al. |
| 2010/0048205 A1 | 2/2010 | Guilford et al. |
| 2010/0056153 A1 | 3/2010 | Attar et al. |
| 2010/0056181 A1 | 3/2010 | Rippon et al. |
| 2010/0110890 A1 | 5/2010 | Rainer et al. |
| 2010/0136978 A1 | 6/2010 | Cho et al. |
| 2010/0149971 A1 | 6/2010 | Noriega |
| 2010/0234021 A1 | 9/2010 | Ngai et al. |
| 2010/0234042 A1 | 9/2010 | Chan et al. |
| 2010/0255849 A1 | 10/2010 | Ore |
| 2010/0267384 A1 | 10/2010 | Dwyer et al. |
| 2010/0279601 A1 | 11/2010 | Phan et al. |
| 2010/0296415 A1 | 11/2010 | Sachs et al. |
| 2010/0296474 A1 | 11/2010 | Noriega |
| 2010/0311435 A1 | 12/2010 | Mueck et al. |
| 2011/0070863 A1 | 3/2011 | Ma et al. |
| 2011/0072101 A1 | 3/2011 | Forssell et al. |
| 2011/0075557 A1 | 3/2011 | Chowdhury et al. |
| 2011/0128907 A1 | 6/2011 | Kvernvik |
| 2011/0142006 A1 | 6/2011 | Sachs |
| 2011/0149879 A1 | 6/2011 | Noriega et al. |
| 2011/0176424 A1 | 7/2011 | Yang et al. |
| 2011/0235615 A1 | 9/2011 | Kalhan |
| 2011/0261695 A1 | 10/2011 | Zhao et al. |
| 2011/0263260 A1 | 10/2011 | Yavuz et al. |
| 2011/0306386 A1 | 12/2011 | Centoza et al. |
| 2012/0013504 A1 | 1/2012 | Raento et al. |
| 2012/0021725 A1 | 1/2012 | Rune |
| 2012/0057503 A1 | 3/2012 | Ding et al. |
| 2012/0108252 A1 | 5/2012 | Dimou et al. |
| 2012/0142352 A1 | 6/2012 | Zhang et al. |
| 2012/0166604 A1 | 6/2012 | Fortier et al. |
| 2012/0195290 A1 | 8/2012 | Bienas |
| 2012/0214525 A1 | 8/2012 | Fujii et al. |
| 2012/0236717 A1 | 9/2012 | Saska et al. |
| 2012/0258674 A1 | 10/2012 | Livet et al. |
| 2012/0258715 A1 | 10/2012 | Souissi et al. |
| 2012/0264412 A1 | 10/2012 | Tervonen et al. |
| 2012/0275371 A1 | 11/2012 | Somasundaram et al. |
| 2012/0294293 A1 | 11/2012 | Kahn et al. |
| 2012/0315905 A1 | 12/2012 | Zhu et al. |
| 2012/0324100 A1 | 12/2012 | Tomici et al. |
| 2013/0005344 A1 | 1/2013 | Dimou et al. |
| 2013/0012182 A1 | 1/2013 | Liao |
| 2013/0021929 A1 | 1/2013 | Kim |
| 2013/0021962 A1 | 1/2013 | Hu et al. |
| 2013/0023302 A1 | 1/2013 | Sivanesan et al. |
| 2013/0028081 A1 | 1/2013 | Yang et al. |
| 2013/0028184 A1 | 1/2013 | Lee et al. |
| 2013/0029708 A1 | 1/2013 | Fox et al. |
| 2013/0045740 A1 | 2/2013 | Gayde et al. |
| 2013/0051379 A1 | 2/2013 | Wang et al. |
| 2013/0053038 A1 | 2/2013 | Lee et al. |
| 2013/0065562 A1 | 3/2013 | Singh |
| 2013/0065585 A1 | 3/2013 | Pelletier et al. |
| 2013/0065589 A1 | 3/2013 | Lee et al. |
| 2013/0111038 A1 | 5/2013 | Girard |
| 2013/0121145 A1 | 5/2013 | Draznin et al. |
| 2013/0121322 A1 | 5/2013 | Salkintzis |
| 2013/0143526 A1 | 6/2013 | Kanugovi et al. |
| 2013/0143542 A1 | 6/2013 | Kovvali et al. |
| 2013/0155849 A1 | 6/2013 | Koodi et al. |
| 2013/0165131 A1 | 6/2013 | Garcia Martin et al. |
| 2013/0170351 A1 | 7/2013 | Reznik et al. |
| 2013/0176988 A1 | 7/2013 | Wang et al. |
| 2013/0183976 A1 | 7/2013 | Zhuang et al. |
| 2013/0188499 A1 | 7/2013 | Mach et al. |
| 2013/0189996 A1 | 7/2013 | Sridhar et al. |
| 2013/0208696 A1 | 8/2013 | Garcia Martin et al. |
| 2013/0210434 A1 | 8/2013 | Dimou et al. |
| 2013/0230011 A1 | 9/2013 | Rinne et al. |
| 2013/0308445 A1 | 11/2013 | Xiang et al. |
| 2013/0322238 A1 | 12/2013 | Sirotkin |
| 2014/0029420 A1* | 1/2014 | Jeong et al. .................. 370/229 |
| 2014/0092306 A1* | 4/2014 | Lee et al. ....................... 348/563 |
| 2014/0092734 A1 | 4/2014 | Lijung |
| 2014/0099945 A1 | 4/2014 | Singh et al. |
| 2014/0128074 A1 | 5/2014 | Vangala et al. |
| 2014/0141785 A1 | 5/2014 | Wang et al. |
| 2014/0161256 A1 | 6/2014 | Bari et al. |
| 2014/0204745 A1 | 7/2014 | Nuss |
| 2014/0247810 A1 | 9/2014 | Bontu et al. |
| 2014/0274066 A1 | 9/2014 | Fodor et al. |
| 2014/0335870 A1 | 11/2014 | Yilmaz et al. |
| 2015/0208280 A1 | 7/2015 | Lorca Hernando |
| 2015/0244520 A1 | 8/2015 | Kariman |

FOREIGN PATENT DOCUMENTS

| | | |
|---|---|---|
| EP | 2197228 | 12/2011 |
| EP | 2533571 | 12/2012 |
| EP | 2632072 | 8/2013 |
| EP | 2603046 | 12/2013 |
| WO | WO 2010/130134 | 11/2010 |
| WO | WO 2011/053204 | 5/2011 |
| WO | WO2012121757 | 9/2012 |

(56) References Cited

FOREIGN PATENT DOCUMENTS

| WO | WO2012149954 | 11/2012 |
|---|---|---|
| WO | WO2012168152 | 12/2012 |
| WO | WO2013127691 | 9/2013 |

OTHER PUBLICATIONS

Jin et al., "SoftCell: Taking Control of Cellular Core Networks," May 15, 2013, Princeton University, Bell Labs.
Bernardos, Carlos J., "Final architecture design," Seventh Framework Programme, 2012, Medieval.
Stavroulaki et al., "Cognitive Control Channels: From Concept to Identification of Implementation Options," IEEE Communications Magazine, Jul. 2012, pp. 96-108, IEEE.
U.S. Appl. No. 14/520,020, filed Oct. 21, 2014.
U.S. Office Action dated Nov. 17, 2014 in U.S. Appl. No. 13/707,535.
U.S. Office Action dated Dec. 24, 2014 in U.S. Appl. No. 13/707,531.
U.S. Office Action dated Dec. 10, 2014 in U.S. Appl. No. 13/707,551.
U.S. Office Action dated Dec. 24, 2014 U.S. Appl. No. 13/707,538.
U.S. Office Action dated Jan. 22, 2015 in U.S. Appl. No. 13/707,539.
U.S. Office Action dated Jan. 22, 2015 in U.S. Appl. No. 14/059,041.
Office Action mailed Mar. 12, 2014 in U.S. Appl. No. 13/707,551.
Office Action mailed Apr. 7, 2014 in U.S. Appl. No. 13/681,141.
U.S. Appl. No. 13/707,532 Office Action mailed Jun. 24, 2014.
U.S. Appl. No. 13/707,531, filed Dec. 6, 2012.
U.S. Appl. No. 13/707,551, filed Dec. 6, 2012.
U.S. Appl. No. 13/707,532, filed Dec. 6, 2012.
U.S. Appl. No. 13/707,534, filed Dec. 6, 2012.
U.S. Appl. No. 13/707,538, filed Dec. 6, 2012.
U.S. Appl. No. 13/707,539, filed Dec. 6, 2012.
U.S. Appl. No. 14/064,329, filed Oct. 28, 2013.
U.S. Appl. No. 13/681,141, filed Nov. 19, 2012.
U.S. Appl. No. 13/748,454, filed Jan. 23, 2013.
U.S. Appl. No. 13/707,535, filed Dec. 6, 2012.
U.S. Appl. No. 14/059,401, filed Oct. 21, 2013.
U.S. Appl. No. 14/084,578, filed Nov. 19, 2013.
Office Action mailed Jun. 27, 2012 in U.S. Appl. No. 12/946,611.
Office Action mailed Mar. 22, 2012 in U.S. Appl. No. 12/946,611.
Office Action mailed Mar. 13, 2012 in U.S. Appl. No. 12/624,643.
Notice of Allowance mailed Aug. 8, 2012 in U.S. Appl. No. 12/624,643.
Office Action mailed Apr. 22, 2013 in U.S. Appl. No. 13/681,141.
Desta Haileselassie Hagos, Rudiger Kapitza, "Study on Performance-Centric Offload Strategies for LTE Networks," TU Braunschweig, Wireless and Mobile Networking Conference (WMNC), 2013 6th Joint IFIP, 2013.
Desta Haileselassie Hagos, "The Performance of WiFi Offload in LTE Networks," Master's Thesis, Lulea University of Technology, Jun. 2012.
Heinonen et al., "Advanced EPC Architecture for Smart Traffic Steering," MEVICO, Nov. 2011.
ETSI, "Universal Mobile Telecommunications System (UMTS); LTE; Access Network Discovery and Selection Function (ANDSF) Management Object (MO)," Apr. 2013, Version 11.6.0, Release 11, France.
DESH, "15 Cellphone chargers that harness kinetic energy for a clean recharge". Copyright Instablogs Network 2009. http://www.greendiary.com/entry/15-cellphone-chargers-that-harness-kinetic-energy-for-a-clean-recharge/. Last accessed Feb. 15, 2011, 10 pages.
Nicole Casal Moore, "Tiny Generators run on good vibrations". Copyright 2009-2011 Futurity.org. http://www.futurity.org/science-technology/tiny-generators-run-on-good-vibrations/ Last accessed Feb. 15, 2011, 5 pages.
Noel McKeegan, "Good vibrations: tiny generator harnesses kinetic energy to power wireless electrical systems". Copyright gizmag 2003-2011. http://www.gizmag.com/go/7584/. Last accessed Feb. 15, 2011, 4 pages.
S.P. Beeby, et al., "Kinetic Energy Harvesting". ACT Workshop on Innovative Concepts. ESA-ESTEC Jan. 28-29, 2008. http://www.esa.int/gsp/ACT/events/workshops/ACT-ART-Bridge2Space-Beeby.pdf Last accessed Feb. 15, 2011, 10 pages.
"Directory:Human-Powered". http://peswiki.com/index.php/Directory:Human-Powered Last accessed Feb. 15, 2011, 11 pages.
Alkhawlani et al., "Intelligent radio network selection for next generation networks," Informatics and Systems (INFOS), 2010 The 7th International Conference on, 2010, pp. 1, 7, 28-30.
Changqing et al., "Optimal Channel Access for TCP Performance Improvement in Cognitive Radio Networks: A Cross-Layer Design Approach," Global Telecommunications Conference, 2009. GLOBECOM 2009. IEEE, 2009, pp. 1, 6.
Samdanis et al., "Traffic Offload Enhancements for eUTRAN," Communications Surveys & Tutorials, IEEE, 2012, vol. 14, No. 3, pp. 884,896.
Watanabe et al., "Radio network selection scheme notified by the each network's real-time performance in the multi-layered communication network," Wireless Personal Multimedia Communications (WPMC), 2012 15th International Symposium on, 2012, pp. 169, 171, 24-27.
Kwon et al., "Load Based Cell Selection Algorithm for Faulted Handover in Indoor Femtocell Network,"Vehicular Technology Conference (VTC Spring), 2011 IEEE 73rd, 2011, pp. 1, 5, 15-18.
Wei et al., "A mobility load balancing optimization method for hybrid architecture in self-organizing network," Communication Technology and Application (ICCTA 2011), IET International Conference on, 2011, pp. 828, 832.
"Macro to small cell, metro cell Hand-in" Alcatel-Lucent, AT&T R3-112026, 3GPP TSG-RAN3 Meeting #73, Athens, Greece, Aug. 22-26, 2011 http://www.3gpp.org/ftp/Specs/html-info/TDocExMtg—R3-73—28511.htm.
Stemm, Mark, and Randy H. Katz. "Vertical handoffs in wireless overlay networks." Mobile Networks and applications 3.4 (1998): 335-350. http://morse.colorado.edu/~timxb/5520/ho/8.pdf.
Chiu, Ming-Hsing, and Mostafa A. Bassiouni. "Predictive schemes for handoff prioritization in cellular networks based on mobile positioning." Selected Areas in Communications, IEEE Journal on 18.3 (2000): 510-522. http://dx.doi.org/10.1109/49.840208.
Soh, Wee-Seng, and Hyong S. Kim. "QoS provisioning in cellular networks based on mobility prediction techniques." Communications Magazine, IEEE 41.1 (2003): 86-92. http://citeseerx.ist.psu.edu/viewdoc/download?doi=10.1.1.98.2622&rep=rep1&type=pdf.
Pollini, Gregory P. "Trends in handover design." Communications Magazine, IEEE 34.3 (1996):82-90. http://inrg.csie.ntu.edu.tw/course/wms/paper/Pollin96.pdf.
Office Action mailed Sep. 13, 2013 in U.S. Appl. No. 13/681,141.
Notice of Allowance mailed Nov. 2, 2012 in U.S. Appl. No. 12/946,611.
Feng, S. et al., "Self-Organizing Networks (SON) in 3GPP Long Term Evolution," Novel Mobile Radio Research, May 20, 2008.
Greenpacket, "Wi-Fi Offload: Authentication and Security Through EAP-Based Approach," Interface, May 2012.
"Universal Mobile Telecommunications System (UMTS); LTE; Access Network Discovery and Selection Function (ANDSF) Management Object (MO)," 3GPP TS 24.312, ETSI TS 124 312 v11.4.0 (Oct. 2012).
U.S. Office Action dated Mar. 4, 2015 in U.S. Appl. No. 13/707,534.
U.S. Office Action dated Mar. 24, 2015 in U.S. Appl. No. 13/707,551.
U.S. Office Action dated Feb. 19, 2015 in U.S. Appl. No. 14/084,578.
U.S. Office Action dated May 12, 2015 in U.S. Appl. No. 13/707,535.
U.S. Office Action dated May 11, 2015 in U.S. Appl. No. 14/064,329.
U.S. Office Action dated Jul. 20, 2015 in U.S. Appl. No. 13/707,534.
U.S. Office Action dated Jul. 9, 2015 in U.S. Appl. No. 13/707,531.
U.S. Office Action dated Jul. 1, 2015 in U.S. Appl. No. 13/707,538.
U.S. Office Action dated Jun. 17, 2015 in U.S. Appl. No. 14/084,578.
U.S. Office Action dated Feb. 25, 2016 in U.S. Appl. No. 13/707,535.
U.S. Office Action dated Sep. 17, 2015 in U.S. Appl. No. 13/707,539.
U.S. Office Action dated Sep. 18, 2015 in U.S. Appl. No. 14/520,020.
U.S. Office Action dated Sep. 30, 2015 in U.S. Appl. No. 13/707,551.
U.S. Office Action dated Nov. 16, 2015 in U.S. Appl. No. 13/707,534.
U.S. Office Action dated Sep. 30, 2015 in U.S. Appl. No. 13/707,535.
U.S. Office Action dated Nov. 16, 2015 in U.S. Appl. No. 13/707,531.
U.S. Notice of Allowance dated Nov. 13, 2015 in U.S. Appl. No. 13/707,538.
U.S. Office Action dated Apr. 14, 2016 in U.S. Appl. No. 13/707,551.

\* cited by examiner

NETWORK SELECTION ARCHITECTURE

TECHNICAL FIELD

The subject disclosure relates to wireless communications and, also generally, to network selection architecture.

BACKGROUND

The use of mobile devices and the resulting mobile traffic has been growing at a very fast pace and the trend shows no signs of stopping. To meet the mobile traffic growth and improve the end user experience, mobile service providers are actively looking for mechanisms to improve network efficiency, system capacity, and end user experience by cost effectively leveraging all radio technologies, including cellular and Wi-Fi technologies. The routing of network traffic to a Wi-Fi radio or to a cellular radio, for example, can impact the user experience. For example, if the network traffic is routed to a network that is not appropriate for that network traffic, it can result in loss of the communication (e.g., dropped calls), poor services, and other negative impacts to the user experience.

BRIEF DESCRIPTION OF THE DRAWINGS

Various non-limiting embodiments are further described with reference to the accompanying drawings in which.

DETAILED DESCRIPTION

Figure 1:
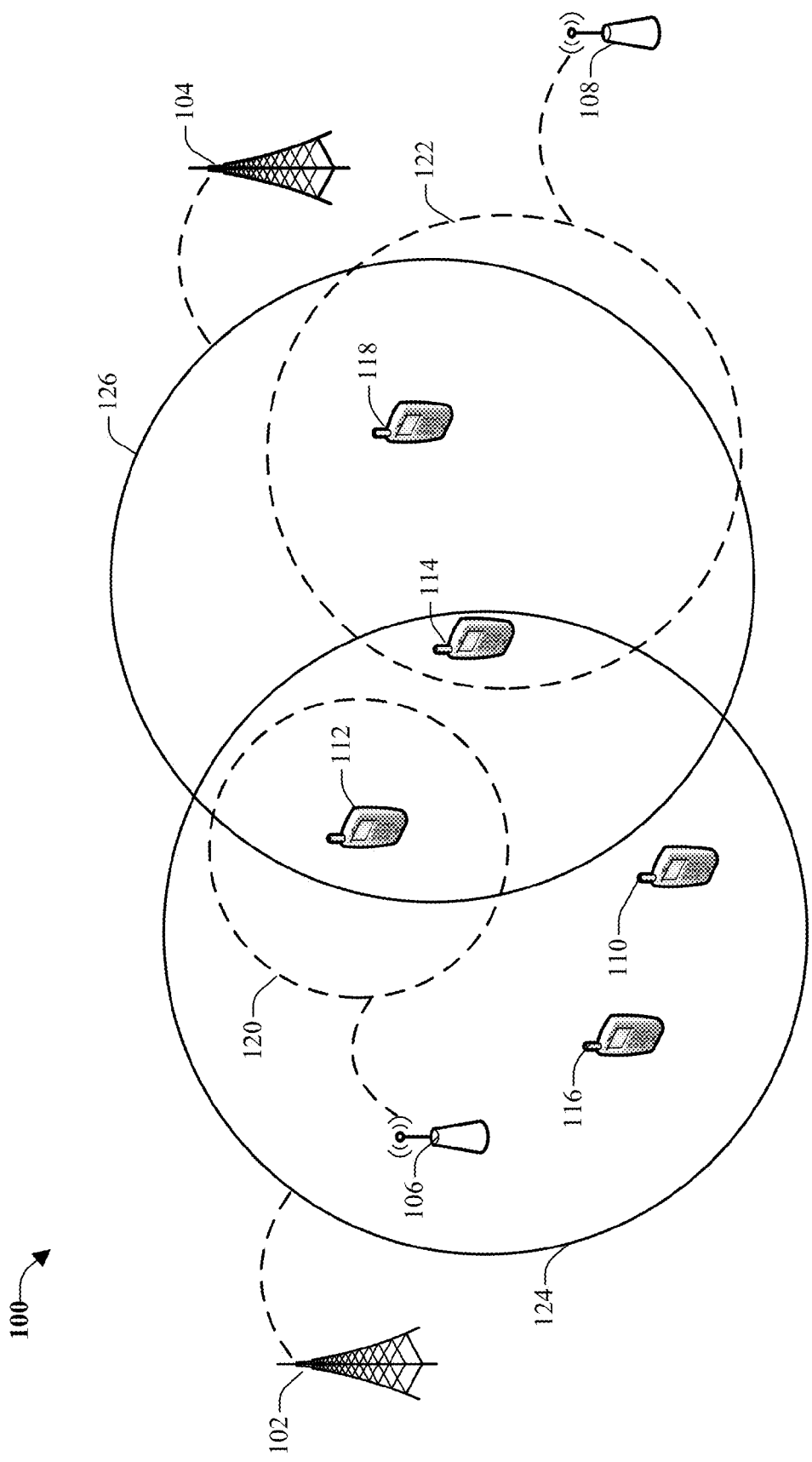
FIG. 1 illustrates an example, non-limiting wireless communications environment that can be utilized with the disclosed aspects.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

To meet mobile traffic growth, one or more of the disclosed aspects provides a network selection architecture that enables selection of the best available radio technology (from all available radio technologies, including cellular and Wi-Fi technologies) for user traffic delivery. The network selection can be based on radio network conditions, user subscription profile, device mobility state (e.g., speed and pattern), applications, and so on, to improve network efficiency. Further, the selection can provide a consistent user experience across multiple types of user equipment, operating system, and original equipment manufacturer (OEM) manufactures and platforms. One or more of the disclosed aspects also provides application program interfaces (APIs) that allow for the development of access network discovery and selection function (ANDSF) carrier clients.

In an embodiment, the user equipment device (e.g., mobile device) makes the decision related to which radio to use, when to use that radio, and under what conditions to route the user traffic based on one or more attributes or conditions. The decision can be based on one or more of the following: an ANDSF policy (which can include the 3GPP ANDSF capabilities, network conditions, and user equipment intelligence); cellular network congestion condition and parameters; Wi-Fi network congestion condition; and/or mobile device information, including battery usage, mobile device relative movement with respect to a Wi-Fi access point (e.g., speed, vibration, patterns), mobile device relative movement with respect to a cellular access point, and so on. Instructions can also be provided as to how to route the user traffic to the selected radio on a per application basis. The instructions can be combined with a user preference and the traffic routing function can be performed (e.g., binding user application/flow to a radio) based in part on the combination.

In another embodiment, the mobile device makes the decision based on dynamic cellular network conditions and parameters obtained from the cellular network via cell broadcast (CB) or system information block (SIB) using a new message or new attributes on an existing message. The dynamic cellular conditions can include load information, signal strength thresholds (e.g., reference signal received power/reference signal code power (RSRP/RSCP), received signal strength indication (RSSI)), and/or subscriber profile based offset to signal strength thresholds percentage.

In a further embodiment, the mobile device makes the decision based on Wi-Fi access point conditions (e.g., basic service set (BSS) load condition, RSSI, and wireless access network (WAN) metrics) via HotSpot2.0 and/or performance measurement over the Wi-Fi network (e.g., round trip time (RTT) delay, jitter, packet loss, and so on).

FIG. 1 illustrates an example, non-limiting wireless communications environment 100 that can be utilized with the disclosed aspects. The wireless communications environment 100 can include a multitude of wireless communications networks, each having a respective coverage area. The coverage area of some of the wireless communications networks can overlap such that one or more mobile devices might be served by any one of the network devices whose coverage areas overlap.

Wireless communications environment 100 includes one or more cellular broadcast servers 102, 104 and one or more Wi-Fi access points 106, 108 deployed within the wireless communications environment 100 and servicing one or more user equipment devices 110, 112, 114, 116, 118. Each wireless communications network (e.g., cellular broadcast servers 102, 104 and Wi-Fi access points 106, 108) comprises one or more network devices (e.g., a set of network devices) that operate in conjunction in order to process network traffic for the one or more user equipment devices 110, 112, 114, 116, 118. For example, cellular broadcast servers 102, 104 can comprise a set of network devices that are cellular enabled network devices. In another example, the Wi-Fi access points 106, 108 can include a set of network devices that are Wi-Fi enabled devices.

As illustrated, each of the one or more Wi-Fi access points 106, 108 has a corresponding service area 120, 122. Further, each of the one or more cellular broadcast servers 102, 104 has a corresponding service area 124, 126. However, it should be understood that the wireless communications environment 100 is not limited to this implementation. Instead, any number of Wi-Fi access points and respective service areas can be deployed within the wireless communications environment 100. Further, any number of cellular broadcast servers and respective service areas can be deployed within the wireless communications network.

Further, although only five user equipment devices 110, 112, 114, 116, 118 are illustrated, any number of user devices can be deployed within the wireless communications environment 100. A user equipment device may contain some or all of the functionality of a system, subscriber unit, subscriber station, mobile station, mobile, wireless terminal, device, mobile device, remote station, remote terminal, access terminal, user terminal, terminal, wireless communication device, wireless communication apparatus, user agent, user device, or user equipment (UE). A mobile device can be a cellular telephone, a cordless telephone, a Session Initiation Protocol (SIP) phone, a smart phone, a feature phone, a wireless local loop (WLL) station, a personal digital assistant (PDA), a laptop, a handheld communication device, a handheld computing device, a netbook, a tablet, a satellite radio, a data card, a wireless modem card and/or another processing device for communicating over a wireless system. In addition, the user equipment devices 110, 112, 114, 116, 118 can include functionality as more fully described herein.

In one aspect, cellular broadcast servers 102, 104 and Wi-Fi access points 106, 108 can monitor their surrounding radio conditions (e.g., by employing respective measurement components). For example, each of the cellular broadcast servers 102, 104 and Wi-Fi access points 106, 108 can determine network traffic load on its respective network by performing a network diagnostic procedure. As an example, during a network listen procedure, cellular broadcast servers 102, 104 and Wi-Fi access points 106, 108 can scan their radio environment to determine network performance statistics. Various parameters associated with cellular broadcast servers 102, 104 and Wi-Fi access points 106, 108 can be detected during the network diagnostic procedure, such as, but not limited to, frequency bands, scrambling codes, common channel pilot power, bandwidth across respective networks, universal mobile telecommunications system terrestrial radio access receive signal strength indicator, and so on.

In an example scenario, user equipment devices 110, 112, 114, 116, 118 can be serviced by networks through one of the cellular broadcast servers 102, 104, or Wi-Fi access points 106, 108. As a user equipment device is moved within the wireless communications environment 100, the respective user equipment device might be moved in and out of the coverage area of the associated serving network. For example, as a user is sending/receiving communications through their respective user equipment device, the user might be walking, riding in a car, riding on a train, moving around a densely populated urban area (e.g., a large city), wherein the movement might cause the mobile device to be moved between various wireless communications networks. In such cases, it is beneficial to route the network traffic (e.g., handoff) from a serving network to a target network in order to continue the communication (e.g., avoid dropped calls).

Depending on location, user equipment devices 110, 112, 114, 116, 118 can have the option to connect to any number of networks. In one scenario, one of the cellular broadcast servers 102, 104 can service all the user equipment devices 110, 112, 114, 116, 118, which can cause excessive load on the respective cellular broadcast server, which in turn can cause user equipment devices 110, 112, 114, 116, 118 to potentially have a negative user experience.

In an aspect, user equipment devices 110, 112, 114, 116, 118 can connect to any available network based on real-time or near-real time network condition statistics and an intelligent network selection policy. Continuing with an example scenario, user equipment device 114 for example, can determine Wi-Fi access point 106 or Wi-Fi access point 108 offer a higher quality of experience and user equipment device 114 can connect to the selected Wi-Fi access point based, in part, on a network selection policy. Further to this example, user equipment device 114 might determine cellular broadcast server 102 or cellular broadcast server 104 offer a higher quality of experience and user equipment device 114 can connect to the selected cellular broadcast server based, in part on the network selection policy. According to another aspect, user equipment device 114 might split its communication traffic flows and use a selected Wi-Fi access point for a set of communication traffic flows and use a selected cellular broadcast server for another set of communication traffic flows.

In some situations, when an option is available where a particular user equipment device can be serviced by either a cellular broadcast server or a Wi-Fi access point, the Wi-Fi access point might automatically be selected. For example, the user equipment device might have user preferences established, which indicates that when a Wi-Fi network is available, network traffic of the user equipment device should be routed to the Wi-Fi network. Such user preference might be established because, in some cases, there is no associated cost to the user of the user equipment device when a Wi-Fi network is utilized, as compared to usage of a cellular network. Thus, the network traffic of the user equipment device is automatically routed to the Wi-Fi network, regardless of the load on the Wi-Fi network and/or other considerations, which could result in a negative user experience (e.g., dropped communications, poor communications, and so on).

However, according to some aspects discussed herein, rather than automatically connecting to a Wi-Fi access point, other considerations can be utilized to route the network traffic of the user equipment device to the Wi-Fi network, or to determine that the network traffic should remain on the cellular network and/or move to a different cellular network or Wi-Fi network. For example, instead of moving to the Wi-Fi network automatically when the Wi-Fi network is available, a comparison is made between the Wi-Fi network and a cellular network. If the Wi-Fi network is more congested than the cellular network, the user traffic of the user equipment device can be routed to the cellular network. However, if it is determined that the Wi-Fi network is not as congested as the cellular network (or both networks have about the same level of congestion), the user traffic of the user equipment device can be routed to the Wi-Fi network.

According to various aspects discussed herein, a user equipment device can continuously, periodically, or based on other temporal conditions, receive data indicative of network statistics (e.g., traffic load or congestion on the network, capability of the network, and so on). As network performance changes, a user equipment device can determine that at least a portion of its respective network traffic should be routed to a different network. The determination can be made based on real-time, or near real-time, network statistics.

In accordance with an implementation, a user equipment device can be configured to perform dynamic intelligent network selection per service provided based on a combination of an access network discovery and selection function policy, network conditions, and intelligence associated with the user equipment device. For example, the user equipment device can autonomously determine under what conditions to route network traffic and to which network (e.g., Wi-Fi radio or cellular radio) the network traffic should be routed on a per application basis (e.g., by splitting traffic flows). The decision can be made in such a manner that the decision has a positive impact on the user experience.

The access network discovery and selection function policy can be received from a network server that can be configured to push (e.g., broadcast) the information to the user equipment device. The network selection policy can include logic that can instruct the user equipment device to select a network based, at least in part, on network statistics, which can include network conditions and load conditions (e.g., network congestion). According to some implementations, one or more network collection agents can monitor multiple networks and can periodically, continuously (e.g., repeatedly) push updated network statistic information to the user equipment device. Such periodic and/or continuous updates can enable real-time or near real-time knowledge of the network conditions by the user equipment device.

Further, according to the various aspects described herein, the network selection can be based, in part, on an operator policy driven intelligent network selection and traffic steering capability based on the network conditions and the user equipment device intelligence that offers optimal (or as close to optimal as possible) and consistent user experience across all user equipment (UE)/operating system (OS)/original equipment manufacturer (OEM) platforms and manufactures.

User equipment devices can communicate with each other and with other elements via a network, for instance, a wireless network, or a wireline network. A "network" can include broadband wide-area networks such as cellular networks, local-area networks, wireless local-area networks (e.g., Wi-Fi), and personal area networks, such as near-field communication networks including BLUETOOTH®. Communication across a network can be packet-based; however, radio and frequency/amplitude modulation networks can enable communication between communication devices using appropriate analog-digital-analog converters and other elements. Communication is enabled by hardware elements called "transceivers." User equipment devices can have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device. A Wi-Fi network is accessible via "access points" such as wireless routers, etc., that communicate with the Wi-Fi transceiver to send and receive data. The Wi-Fi network can further be connected to the internet or other packet-based networks. The "bandwidth" of a network connection or an access point is a measure of the rate of data transfer, and can be expressed as a quantity of data transferred per unit of time. Additionally, communication (e.g., voice traffic and/or data traffic) between one or more components can include, wired communications (e.g., routed through a backhaul broadband wired network, an optical fiber backbone, twisted-pair line, T1/E1 phone line, digital subscriber line, coaxial cable, and/or the like), and or radio broadcasts (e.g., cellular channels, Wi-Fi channels, satellite channels, and/or the like).

A network can include a plurality of elements that host logic for performing tasks on the network. The logic can be hosted on servers, according to an aspect. In packet-based wide-area networks, servers may be placed at several logical points on the network. Servers may further be in communication with databases and can enable communication devices to access the contents of a database. Billing servers and application servers are examples of such servers. A server can include several network elements, including other servers, and can be logically situated anywhere on a service provider's network, such as the back-end of a cellular network. A server hosts or is in communication with a database hosting an account for a user of a mobile device. The "user account" includes several attributes for a particular user, including a unique identifier of the mobile device(s) owned by the user, relationships with other users, application usage, location, personal settings, business rules, bank accounts, and other information.

Figure 2:
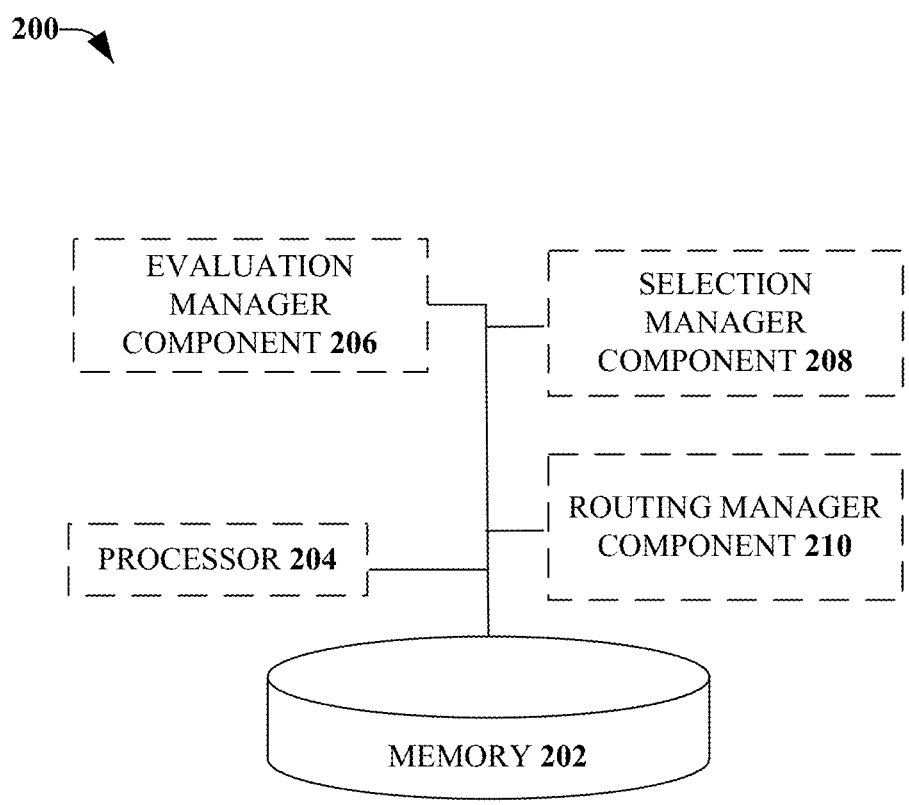
FIG. 2 illustrates an example, non-limiting system for routing network traffic, according to an aspect.

FIG. 2 illustrates an example, non-limiting system 200 for routing network traffic, according to an aspect. System 200 can be implemented, for example, on a user equipment device. System 200 comprises at least one memory 202 that can store computer executable components and instructions. System 200 can also include at least one processor 204, communicatively coupled to the at least one memory 202. Coupling can include various communications including, but not limited to, direct communications, indirect communications, wired communications, and/or wireless communications. The at least one processor 204 can facilitate execution of the computer executable components stored in the at least one memory 202. The at least one processor 204 can be directly involved in the execution of the computer executable component(s), according to an aspect. Additionally or alternatively, the at least one processor 204 can be indirectly involved in the execution of the computer executable component(s). For example, the at least one processor 204 can direct one or more components to perform the operations.

It is noted that although one or more computer executable components may be described herein and illustrated as components separate from the at least one memory 202 (e.g., operatively connected to memory), in accordance with various embodiments, the one or more computer executable components could be stored in the at least one memory 202. Further, while various components have been illustrated as separate components, it will be appreciated that multiple components can be implemented as a single component, or a single component can be implemented as multiple components, without departing from example embodiments.

System 200 also includes an evaluation manager component 206 that can be configured to compare one or more parameters associated with two or more wireless networks. According to an implementation, parameters associated with a first network can be compared to parameters associated with a second network and/or a parameters associated with subsequent (e.g., third, fourth) networks. For example, the one or more parameters associated with the communications networks can include congestion conditions and network parameter conditions. According to an aspect, the one or more parameters can include network load information. In accordance with another aspect, the one or more parameters can include bandwidth utilization of the network (e.g., 3G, 4G, long term evolution, and so on). Other parameters can include peak usage times, available bandwidth of a network, a number of requests received by a network resource, as well as other metrics.

In an implementation, a first wireless network can include network devices that are cellular enabled devices (e.g., a cellular network) and a second wireless network can include network devices that are Wi-Fi enabled devices (e.g., a Wi-Fi network). Parameters related to the cellular networks can include cellular network congestion condition and parameters received through cell broadcast or a system information block(s). Dynamic cellular conditions include load information, signal strength thresholds, and/or subscriber profile based offset to signal strength threshold percentages. Parameters related to the Wi-Fi networks can include Wi-Fi network access point conditions, such as BSSI load condition, RSSI, and WAN metrics and/or performance measurements over the Wi-Fi network.

The evaluation manager component 206 can also be configured to compare the one or more network parameters, associated with the two or more wireless networks, with one or more parameters associated with the user equipment device. The one or more parameters of the user equipment device can include usage information (e.g., applications being executed (e.g., running) on the user equipment device). The parameters can also include a movement parameter of the user equipment device. The movement parameter can relate to whether the user equipment device is stationary or moving and, if moving, a speed at which the device is being moved and/or a direction to which the device is being moved. The speed and/or direction of the device can be analyzed with respect to a location of a cellular network and/or a Wi-Fi network, according to an implementation. For example, if the user equipment device is being moved toward a network, that network might be favored over a network that the device is being moved away from, or not directly headed toward. In an example, speed and/or movement of the device can be determined based on a vibration pattern of the device. Other parameters can include user preferences and/or settings associated with the selection of a network for routing of network traffic. Further parameters can include a battery usage and/or remaining battery capability (e.g., battery life).

Also included in system 200 is a selection manager component 208 that can be configured to determine which radio technology (and associated set of network devices) should be chosen such that at least a portion of the network traffic of the user equipment (also referred to as user traffic) is routed to the selected network (e.g., by a routing manager component 210). For example, the comparison performed by the evaluation manager component 206 can produce various possible results. For example, a first possible result can be that at least a portion of the network traffic of the user equipment device should be routed to a first set of network devices (e.g., a first set of target devices), which are associated with a first radio technology. Further, a second possible result can be that the portion of the network traffic (or another portion of network traffic) of the user equipment device should be routed to a second set of network devices (e.g., a second set of target devices), which are associated with a second radio technology.

The determination performed by selection manager component 208 can comply with a network selection policy received from a network device that currently provides a service to the user equipment device (e.g., a set of source devices). In an implementation, complying with the network selection policy can include observing discovery information and selection policies of the serving network (e.g., set of serving devices). The discovery information can relate to one or more traffic routing rules established by the serving network. According to some implementations, instructions related to the network selection policy (e.g., how to route the user traffic) can be combined with a user preference in order for the selection manager component 208 to make the network determination.

In an example, a cellular network and/or a Wi-Fi network might be chosen as a result of the cellular network condition when combined with the Wi-Fi condition for the determination. For example, if the cellular network is loaded (e.g., high congestion) and the Wi-Fi network is not congested, under that condition, the Wi-Fi network can be chosen. However, if the cellular network is not congested and also the Wi-Fi network is not congested, the cellular network might be chosen. Thus, the decision is made in part based on comparison of both the networks.

The routing manager component 210 is configured to route one or more portions of the network traffic of the user equipment device to the set of network devices chosen by the selection manager component 208. For example, the routing manager component 210 can be configured to change functionality of the user equipment device from a cellular connectivity function to a Wi-Fi connectivity function. In another example, the routing manager component 210 can be configured to change the functionality of the user equipment device from a Wi-Fi connectivity function to a cellular connectivity function. The routing manager component 210 is configured to perform the appropriate signaling between a source network and the target network to enable seamless handoff or routing of the user network traffic.

According to an implementation, the routing manager component 210 is configured to route a first set of network traffic of the user equipment device (e.g., a first set of traffic flows) to a first network and to route a second set of network traffic of the user equipment device (e.g., a second set of traffic flows) to a second network. For example, a cellular network might be congested and, therefore, some of the traffic of the user equipment device can be kept on (or routed to) a LTE network, for example. At the same time, a media application or video sharing application might be executing on the user equipment device and this set of traffic can be routed to (or kept on) a Wi-Fi network. In such a manner, different sets of traffic flows of the user equipment device can be split, wherein some of the traffic flows are routed to a cellular network while other traffic flows are routed to a Wi-Fi network. Such splitting of the traffic flows can be determined based in part, on the network policy, such as a network selection policy, for example.

Figure 3:
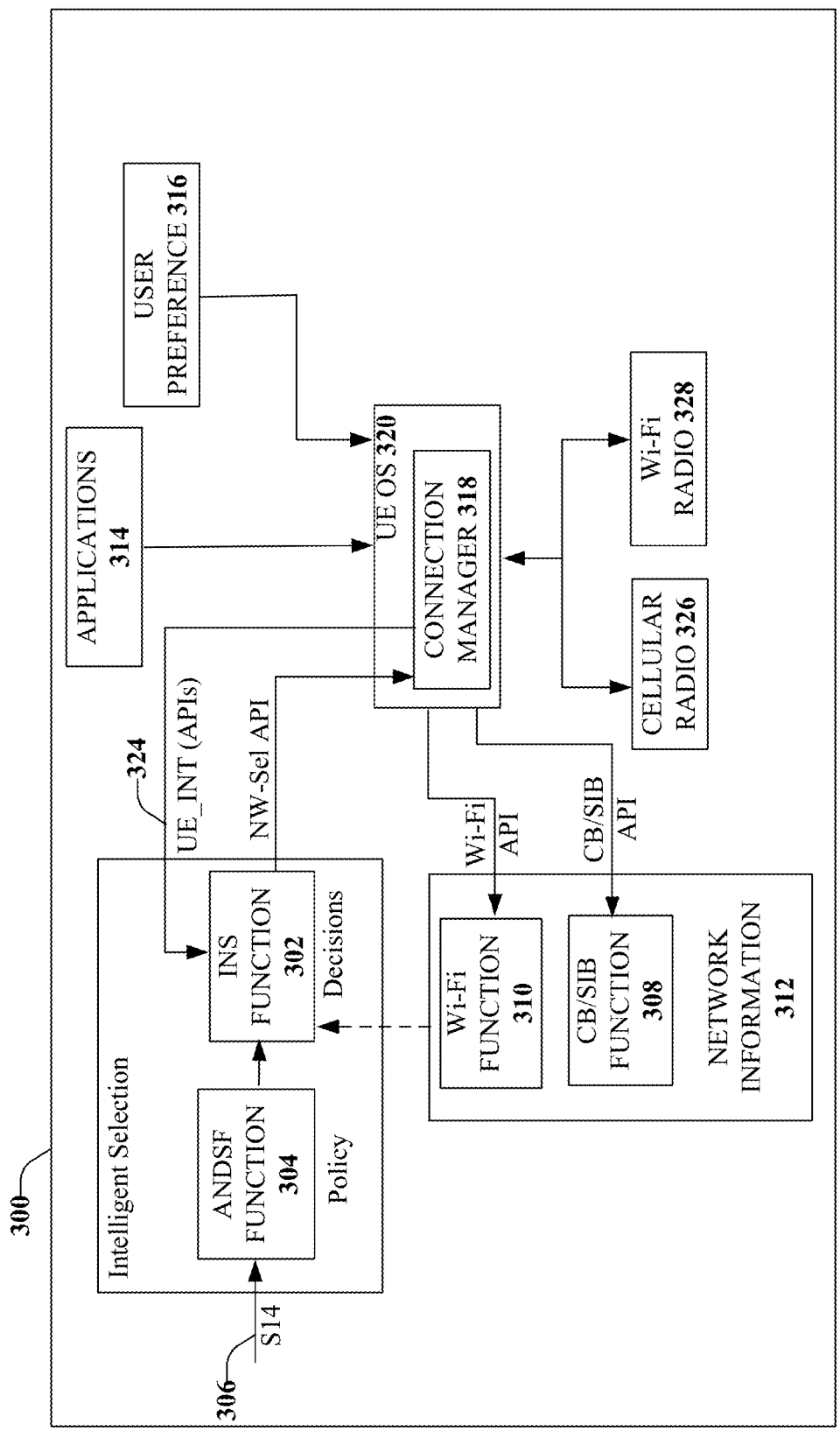
FIG. 3 illustrates an example, non-limiting network selection system, according to an aspect.

FIG. 3 illustrates an example, non-limiting network selection system 300, according to an aspect. System 300 can implemented on a user equipment device and is an example architecture for the user equipment device. As provided herein, the disclosed aspects enable dynamic intelligent network selection per service provider policy based on a combination of an access network discovery and selection function, network conditions, and user equipment device intelligence.

Included in system 300 is an intelligent network selection function 302 (INS function) that makes a network selection decision as to which radio, when, and under what conditions network traffic (of the user equipment device) should be routed based on different types of input. In order to perform this selection function, various information should be received at the user equipment device and/or generated by the user equipment device. Examples of information received at the user equipment device include network congestion conditions and/or network parameter conditions. Examples of information generated by the user equipment device include usage information and movement parameters of the user equipment device.

A first input received by system 300 can be a service provider access network discovery and selection function policy, which can be received by an access network discovery and selection function 304 (ANDSF function). The service provider access network discovery and selection function policy can be received through an S14 interface 306 for example. The access network discovery and selection function policy can include, according to an implementation, the 3GPP access network discovery selection function capabilities and enhancements, such as network conditions and user equipment device intelligence. The selection manager component 208 (of FIG. 2) utilizes the access network discovery and selection function policy to perform selection of a radio network (e.g., a radio technology).

Another input to the system 300 can be a cellular network congestion condition and one or more cellular network parameters. This input can be received by at a cell broadcast (CB)/system information block (SIB) function (illustrated as CB/SIB function 308). The network conditions and parameters can be transmitted through a cell broadcast or a system information block. The CB/SIB function 308 can be a cellular network intelligent function on the user equipment device that receives and/or extracts various dynamic cellular network condition(s) and/or parameter(s) from the cellular network. Such cellular network conditions(s) and/or parameter(s) can be obtained through the CB or SIB using a new message or new attributes on an existing message, for example.

A cellular network condition can relate to load information, which can be in the format of a load flag. For example, the load flag can be color-coded (e.g., red, yellow, green, and so forth) to indicate the amount of network traffic (e.g., load) on that particular cellular network. In another example, another manner of indicating the load information on the cellular network can be utilized (e.g., a pie chart, a line chart, based on a number of lights illuminated, and so on).

Another cellular network condition can relate to signal strength thresholds. For example, a signal strength threshold is a reference signal received power (RSRP) over the reference signal subcarriers, in a long term evolution (LTE) implementation. In another example, a signal strength threshold can be a reference (received) signal code power (RSCP) in a universal mobile telecommunications system (UMTS) implementation.

A cellular network profile can relate to a subscriber profile based offset to signal strength thresholds. For example, a user equipment device associated with a first signal strength threshold can be ranked differently than another user equipment device associated with a second signal strength threshold. In an implementation, the various thresholds can be associated with different colors. For example, the first signal strength threshold can be coded as a "gold user" and the second signal strength threshold can be coded as a "silver user", wherein the gold user has a different offset from the silver user.

Another cellular network condition or profile can be a percentage that can be used to move portions or sets of the user equipment devices between cellular networks and Wi-Fi networks. For example, a threshold level of a number or percentage of users that can be adequately serviced by a particular network might be utilized. According to this implementation, when the threshold level or threshold percentage is reached (or almost reached), no new user equipment devices might be routed to that network until the amount of user equipment devices serviced by the network is below the threshold level. In an example, the percentage can be indicative of a congestion percentage (e.g., based on total available bandwidth, used bandwidth, or capable bandwidth verses used bandwidth).

Another input can be a Wi-Fi network congestion condition and one or more Wi-Fi network parameters, illustrated as a Wi-Fi function 310. The Wi-Fi function 310 can relate to a Wi-Fi network condition function on the user equipment device that receives and/or extract Wi-Fi access point conditions. One condition can be a basic service set (BSS) load condition. Another condition can be a received signal strength indicator (RSSI). A further condition can be wireless access node (WAN) metrics via HotSpot2.0. Another condition can be a performance measurement over the Wi-Fi network, which can include round trip time (RTT) delay, jitter, packet loss, and so on.

The CB/SIB function 308 and the Wi-Fi function 310 represent network information 312. Such network information can be utilized by the evaluation manager component 206 (of FIG. 2) to perform the comparison. For example, the network information is utilized with the information obtained related to the user equipment device to perform the comparison.

A further input can be user equipment device intelligence. Such information can include applications 314 executing on the user equipment device. For example, some applications might be better served by a cellular radio (e.g., cellular network), while other applications might execute well on either cellular networks or Wi-Fi networks. If an application executing on the user equipment device might not function properly on a Wi-Fi network, the decision to route the network traffic to the Wi-Fi network might be delayed and/or disabled, according to an aspect. In another example, traffic flows might be split so that some traffic flows utilize the Wi-Fi network while other traffic flows utilize the cellular network.

Another input can include user preferences 316. For example, a user preference might be to route the network traffic to a Wi-Fi network whenever a Wi-Fi network is available. Such user preference is taken into consideration when a determination is made whether (or not) to route the network traffic to a Wi-Fi network. In some instances, the traffic will not be routed to the Wi-Fi network even though the Wi-Fi network is available and is preferred by the user (e.g., user preference).

A connection manager 318 can be included as a portion of the user equipment device operating system (OS 320). The connection manager 318 can comprise instructions or actions on how to route user traffic to the proper radio (e.g., Wi-Fi radio or cellular radio) on a per application basis (e.g., as a function of the applications 314 executing, or expected to be executed, on the user equipment device), by splitting the traffic flows. It is noted that the term "connection manager" can refer to any entity that performs a traffic routing function (e.g., such as a routing manager component 210). For example, connection manager can refer to an entity that binds user application/flow to a radio. The connection manager can be a native connection manager, a connectivity engine, or the like.

User equipment device intelligence can relate to intelligent network selection (e.g., INS function 302), which can relate to various information that can be known (or generated) internal to the user equipment device. Such intelligence can include battery usage level (e.g., amount of battery life remaining, statistics as to the amount of battery being consumed for various applications and/or programs executing on the user equipment device, and so on). Another example of user equipment device intelligence relates to the user equipment device relative movement to the Wi-Fi access point. The relative movement can include speed, vibration patterns, and so on. For example, relative movement can relate to whether the user equipment device is stationary or is moving and, if moving, the speed at which the user equipment device is being moved. In another example, the relative movement can relate to a direction that the user equipment device is being moved relative to the locations of the various radio networks. This information can be received from the connection manager 318, illustrated at 324, according to an aspect.

As discussed above, the "connection manager" is a generic term that refers to an entity that takes the input from the user preference and operator intelligent network selection instruction and performs a traffic routing function. For example, the connection manager can bind user application/flow to a radio (e.g., cellular radio 326 and/or Wi-Fi radio 328). The connection manager can be a native connection manager, a connectively engine, or the like.

System 300 can be configured to enable the service provider to provide seamless policy driven intelligent network selection that takes into account the network condition and the user equipment device intelligence. System 300 can also provide a consistent user experience across many different types of manufacturers and platforms. Further, the disclosed aspects can improve overall network efficiency. In addition, by separating the areas of concerns, the intelligent network selection can be decoupled from the operating system, which enables faster implementation for user equipment devices.

Figure 4:
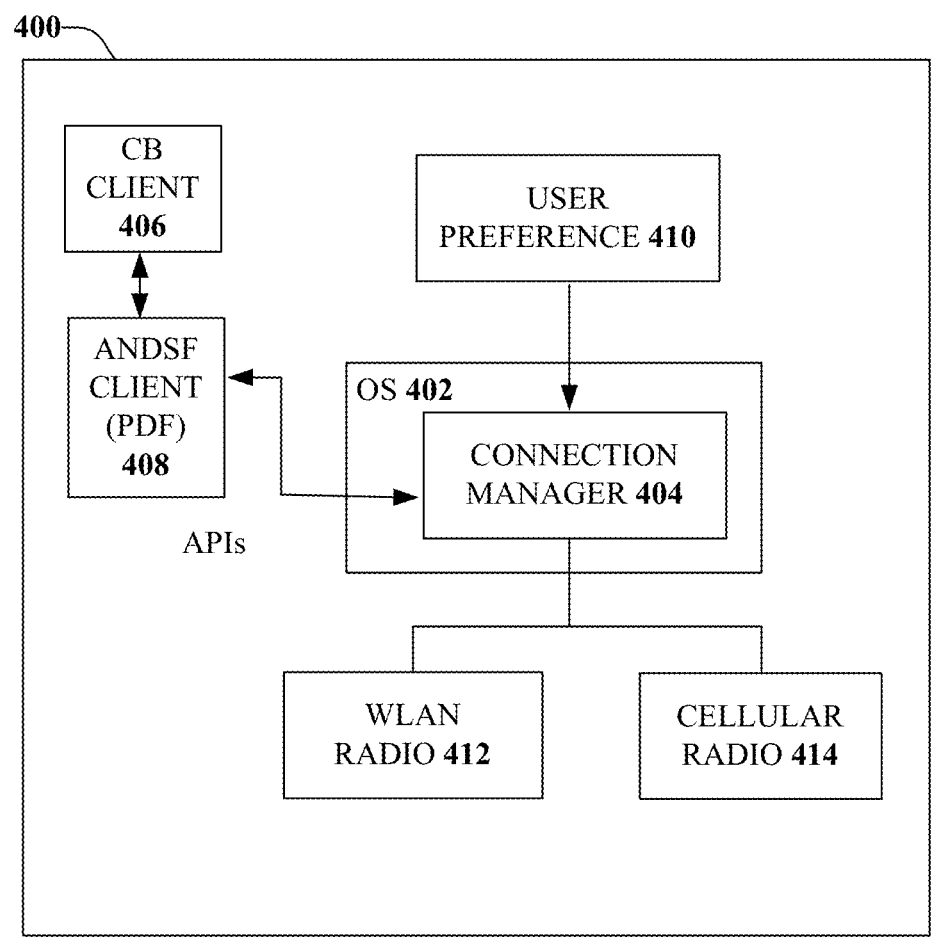
FIG. 4 illustrates an example, non-limiting implementation of an intelligent network selection architecture for a user equipment device, according to an aspect.

FIG. 4 illustrates an example, non-limiting implementation of an intelligent network selection architecture 400 for a user equipment device, according to an aspect. Illustrated is an operating system 402 (OS) of the user equipment device and application program interfaces (APIs) that allow for development of access network discovery of access network discovery and selection function carrier clients. For example, a decision as to which radio, when, and under what conditions is made by the user equipment device. The user equipment device implements the APIs to instruct a connection manager 404 on action. Further, there is separation of the areas of concern. Therefore, the APIs are decoupled from the operating system 402.

The APIs are utilized as enablers that provide the necessary information and/or support for the various components to perform network selection, according to an aspect. The user equipment device architecture 400 utilizes the operating system 402 or lower layer components (e.g., chipset or connectivity engine) to expose the various APIs to allow for the service provider intelligent network selection function to collect intelligence from the network and the user equipment device and to instruct the connection manager 404 on action that should be taken.

The operating system 402 and/or connection manager 404 notifies a CB/SIB client 406 of the received cellular load information along with other parameters (as discussed herein) and sets up a data path to deliver the load to the CB/SIB client function 308 (of FIG. 3). The cellular network condition includes, but is not limited to, load information, signal strength thresholds, usage, subscriber profile offset, and so on. The Wi-Fi API obtains Wi-Fi access point conditions, such as BSS and WAN metrics, and so forth, from the operating system 402 or from a lower layer.

A user equipment device intelligence API obtains the user equipment local information. This information can include battery usage, relative movement to Wi-Fi access point (speed, vibration patterns, and so on), from the operating system 402 to other applications.

Also included is an access network discovery and selection function client 408 (ANDSF client) that performs a policy decision function (PDF). The decision as to which network the network traffic should be routed can be selected in order to comply with the access network discovery and selection function policy, as discussed herein. Consideration is also given to a user preference 410, which can indicate a preference of a particular type of network over another type of network.

The intelligent network selection API class provides the operator's policy to the connection manager 404. This information allows the connection manager 404 to route applications to a specific radio (e.g., WLAN radio 412 and/or cellular radio 414). The intelligent network selection API binds an application with a corresponding radio based on operator policies and/or user preferences. Such binding can result in different sets of network traffic flows of the user equipment device being split between two (or more) networks (e.g., a first set of traffic flows is routed to a first network and a second set of traffic flows is routed to a second network).

Figure 5:
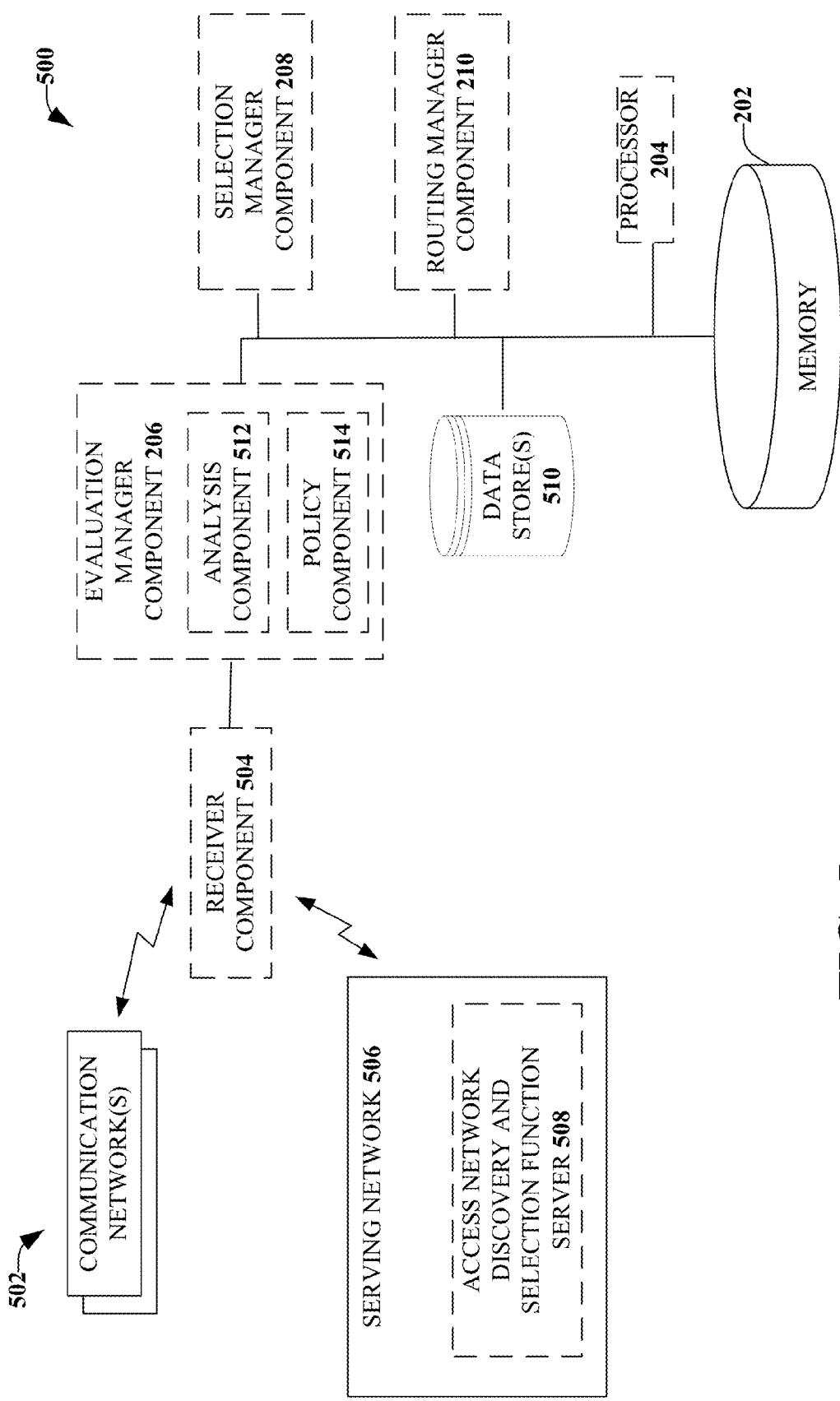
FIG. 5 illustrates an example, non-limiting system for routing network traffic between communications networks, according to an aspect.

FIG. 5 illustrates an example, non-limiting system 500 for routing network traffic between communications networks, according to an aspect. System 500 includes a memory 202 and a processor 204 operatively connected to the memory 202. An evaluation manager component 206 is configured to compare various parameters of one or more communications networks 502 with various parameters of a user equipment device (which implements system 500). Evaluation manager component 206 can be operatively connected to a receiver component 504 that can be configured to receive the various parameters from the one or more communications networks 502.

For example, each communications network of the one or more communications networks 502 can monitor parameters related to network congestion and/or other network parameters. According to an implementation, the parameters can include, but are not limited to, traffic load over the network and available bandwidth of the network. Other parameters can include, but are not limited to, signal strength thresholds, received signal strength indications, and/or subscriber profile based offset to signal strength thresholds percentage.

Receiver component 504, or another system 500 component, can be configured to obtain network selection policy information for a serving network 506, (e.g., from a network device that provides a service to the user equipment device). The network selection policy information can include discovery information and selection policies of the serving network 506.

For example, the serving network 506 can comprise an access network discovery and selection function server 508 that can utilize network security techniques to communicate securely with a selected group of user equipment devices. For example, access network discovery and selection function server 508 can authenticate select user equipment devices and allow only those user equipment devices that are serviced by a particular service provider to communicate with the access network discovery and selection function server 508. Further, access network discovery and selection function server 508 can utilize secure channels, encoded channels, encrypted channels, and the like to perform communications within a wireless network environment.

Access network discovery and selection function server 508 can create and determine network traffic steering rules (or routing rules). The network traffic steering rules can be created for individual user equipment devices or for groups of user equipment devices. In one or more implementations, access network discovery and selection function server 508 can create group network traffic steering rules for groups of user equipment devices based on, for example, subscription profiles, quality of service agreements, user equipment device type, user equipment device capabilities, and so on.

According to an implementation, a network traffic steering rule can include instructions to guide a user equipment device in connection with radio access network selection. For example, a traffic steering rule can include instructions for radio access network selection based on network load condition, mobility states, user equipment device hardware metrics, user equipment device performance metrics, and so on.

The access network discovery and selection function server 508 can create one or more traffic steering rules when a new subscription is created, when a subscription is modified, when a user equipment device location changes, and so forth. Thus, access network discovery and selection function server 508 can create and/or modify traffic steering rules and store the traffic steering rules in one or more data stores 510 (e.g., a library) for future use. It is noted that although an access network discovery and selection function server 508 is illustrated and described as an exemplary component, system 500 can utilize various servers, components, and/or articles of manufacture to perform the same, or substantially the same, functions as access network discovery and selection function server 508 as discussed herein.

In some implementations, access network discovery and selection function server 508 can communicate traffic steering policies to the user equipment device. In one aspect, access network discovery and selection function server 508 can assist user equipment device in discovery of non-third generation partnership project access networks (e.g., Wi-Fi or worldwide interoperability for microwave access). In another aspect, access network discovery and selection function server 508 can select appropriate traffic steering policies for a user equipment device and issue the policies. In one aspect, access network discovery and selection function server 508 selects the traffic steering rule based on a user subscription, a user account, or other classification associated with user equipment device. In another aspect, access network discovery and selection function server 508 communicates the appropriate traffic steering policy over a communication framework. In an aspect, access network discovery and selection function server 508 can communicate directly with user equipment device through a server to client connection (e.g., standard S14 interface). However, access network discovery and selection function server 508 can communicate with user equipment device through an indirect connection, a cellular broadcast, and the like, in accordance with some implementations.

The policy information provided by the access network discovery and selection function server 508 can be retained in the one or more data stores 510. According to an implementation, one or more data stores 510 can be integrated with the evaluation manager component 206 and/or memory 202. In another implementation, one or more data stores 510 can be located external to, but accessible by, the evaluation manager component 206 and/or memory 202. It is noted that a data store can include volatile memory or nonvolatile memory, or can include both volatile memory and nonvolatile memory. By way of illustration, and not limitation, nonvolatile memory can include read only memory, programmable read only memory, electrically programmable read only memory, electrically erasable programmable read only memory, or flash memory. Volatile memory can include random access memory, which can operate as external cache memory. By way of illustration and not limitation, random access memory is available in many forms such as static random access memory, dynamic random access memory, synchronous dynamic random access memory, double data rate synchronous dynamic random access memory, enhanced synchronous dynamic random access memory, Synchlink dynamic random access memory, and direct Rambus random access memory. The memory (e.g., data stores, databases, and so on) of the various disclosed aspects is intended to comprise, without being limited to, these and any other suitable types of memory.

The evaluation manager component 206 can also receive information related to the user equipment device. For example, usage of the user equipment device can be received by the evaluation manager component 206. The usage can indicate how the device is being used (e.g., voice call, data call, streaming video, surfing the Internet, and so forth). The usage can also indicate the applications being executed on the user equipment device, wherein more than one application might be executing at any particular time. Some applications might perform better (e.g., have a better connectivity) with a cellular network and other applications might perform as expected on either a cellular network or a Wi-Fi network. According to an implementation, traffic flows of the user equipment device can be split between radio networks as discussed herein.

Other information related to the user equipment device and received by the evaluation manager component 206 can be one or more mobility parameters of the user equipment device. A mobility parameter can relate to whether the user equipment device is stationary or is moving and, if moving a speed at which the user equipment device is being moved. For example, the user equipment device might be stationary (e.g., a user of the user equipment device is sitting at her desk). In another example, the user equipment device might be moved and traveling at different speeds, which can be a function of the mode of transportation (e.g., walking, riding a bicycle, in a car, on a train, in a airplane, and so on).

Another parameter relates to the direction that the user equipment device is being moved. The direction can be a horizontal direction, which can be associated with cardinal directions or cardinal points (e.g., north, south, east, west, or intermediate points). Further, the direction can include an altitude (or changes in the height) of the user equipment device. For example, the user equipment device might be traveling in an elevator and a range of one network might not reach all points along that altitude (e.g., connectivity is only enabled at the higher locations).

An analysis component 512 can be configured to compare the information related to the networks and the information related to the user equipment device. For example, if a network has a congestion condition that is near, or approaching, a maximum congestion level, that network might be removed from consideration. In another example, if the user equipment device is being moved toward a network, the evaluation manager component 206 and/or analysis component 512 can take into consideration the movement of the user equipment device and might give more consideration to the one or more networks that are expected to be located along the movement path of the user equipment device.

A policy component 514 can be configured to review the recommendation provided by the analysis component 512 and determine if the selected network complies with the access network discovery and selection function policy of the serving network 506. According to some aspects, the policy component 514 ascertains whether a network conforms to the policy before the analysis component 512 analyzes the information related to the network. Thus, if a particular network does not conform to the policy, that particular network is not considered by the analysis component 512. Further, information related to that network is not obtained (or is disregarded if such information is obtained).

Based on the recommendation of the analysis component 512, a selection manager component 208 can determine to which radio technology or radio network (e.g., set of network devices) the network traffic of the user equipment device should be routed. For example, the comparison by the analysis component 512 might reveal that although various network could properly service the user equipment device, based on user preferences, only cellular networks should be used. In another example, based on user preferences, Wi-Fi networks should be used, where feasible. In a further example, based on an application (or multiple applications) executing on the user equipment device, a particular radio technology (or more than one radio technology) can be selected for at least a portion of the user traffic.

A routing manager component 210 provides the appropriate signaling to the source network and the target network in order to route at least a portion of the network traffic of the user equipment device to the selected network. Such signaling can utilize various types of signaling as a function of the network types and other parameters and these signaling techniques will not be discussed herein for purposes of simplicity.

According to some implementations, the various aspects disclosed herein can utilize an artificial intelligence component (not shown), which can facilitate automating one or more features in accordance with the disclosed aspects. As discussed herein, the disclosed aspects have a wide application and can provide consistent implementations across different device original equipment manufacturers and/or operating systems. The disclosed aspects in connection with monitoring, analyzing, and comparing device network traffic usage can employ various artificial intelligence-based schemes for carrying out various aspects thereof. For example, a process for receiving network congestion conditions and parameters, comparing the network congestion conditions and parameters with one or more usage and one or more movement parameters of a user equipment device can be facilitated with an example automatic classifier system and process.

An example classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that can be automatically performed. In the case of communication systems, for example, attributes can be types of radio networks, congestion thresholds and the classes can be a type of traffic usage (e.g., voice traffic, data traffic, short message service traffic, and so on), the amount of network traffic usage, the expected location of a user equipment device based on a movement parameter, and so on.

A support vector machine is an example of a classifier that can be employed. The support vector machine can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing usage of the user equipment device, by observing a movement pattern of the user equipment device, and so on). For example, support vector machines can be configured via a learning or training phase within a classifier constructor and feature selection module. Thus, the classifier(s) can be used to automatically learn and perform a number of functions, including but not limited to ascertaining network traffic should be routed from a source network to a target network, determining the user equipment device is likely to be moved into the coverage area of one or more networks, determining an application executing on the user equipment device (or anticipated to be executed on the user equipment device) can be supported by a particular network, and so forth. Further functions can include, but are not limited to, gathering information (e.g., network traffic usage information, network congestion information) from a group of devices (e.g., a set of network devices), aggregating the data gathered from the subject user equipment device, comparing two or more networks to determine the most appropriate network for routing of the network traffic, and so on. The criteria can include, but is not limited to, a type of network traffic, patterns associated with network traffic usage, and so on.

In view of the example systems shown and described herein, methods that may be implemented in accordance with the one or more of the disclosed aspects, will be better understood with reference to the following flow charts. While, for purposes of simplicity of explanation, the methods are shown and described as a series of blocks, it is to be understood that the disclosed aspects are not limited by the number or order of blocks, as some blocks may occur in different orders and/or at substantially the same time with other blocks from what is depicted and described herein. Moreover, not all illustrated blocks may be required to implement the methods described hereinafter. It is noted that the functionality associated with the blocks may be implemented by software, hardware, a combination thereof or any other suitable means (e.g. device, system, process, component). Additionally, it is also noted that the methods disclosed hereinafter and throughout this specification are capable of being stored on an article of manufacture to facilitate transporting and transferring such methodologies to various devices. Those skilled in the art will understand that a method could alternatively be represented as a series of interrelated states or events, such as in a state diagram. The various methods disclosed herein can be performed by a system comprising at least one processor and/or a mobile device (e.g., user equipment device) comprising at least one processor.

Figure 6:
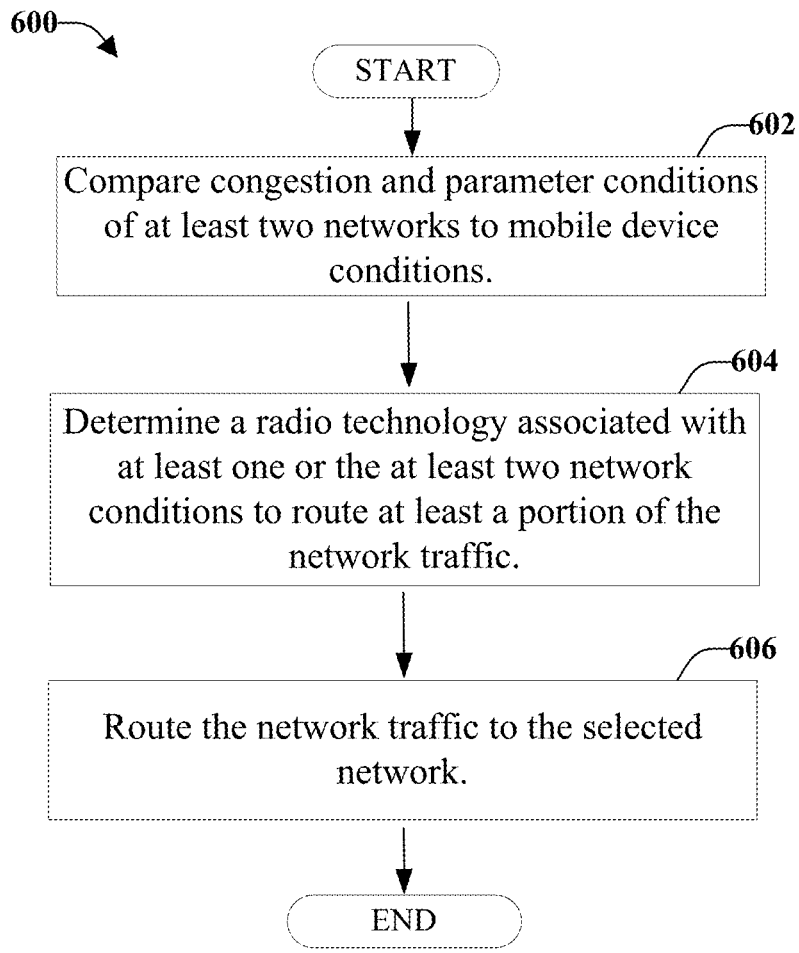
FIG. 6 illustrates an example, non-limiting method for routing network traffic, according to an aspect.

FIG. 6 illustrates an example, non-limiting method 600 for routing network traffic, according to an aspect. At 602, network congestion conditions and network parameter conditions related to two or more communications networks are compared with a usage and a movement parameter of the mobile device (e.g., using a evaluation manager component 206). The network congestion conditions and network parameter conditions can be received from respective networks (e.g., respective sets of network devices included in each network). The usage and movement parameter of the mobile device can be obtained internally from the mobile device.

At 604, a determination is made as to a radio technology associated with at least one of the set of network devices to which at least a portion of the network traffic of the mobile device should be routed (e.g., using a selection manager component 208). The determination can include considerations related to adhering to the discovery information and selection policies associated with a set of network devices of a serving network (e.g., source network). For example, if a particular network is not an appropriate network according to the discovery information and selection policies, then that network is removed from consideration.

Network traffic of the mobile device is routed, at 606, to the selected set of network devices (e.g., using a routing manager component 210). According to some aspects, a portion of the network traffic of the mobile device is routed to a first set of network devices associated with a first radio technology and another portion of the network traffic of the mobile device is routed to a second set of network devices associated with a second radio technology. For example, traffic flows of the mobile device can be split between the first set of network devices and the second set of network devices.

Figure 7:
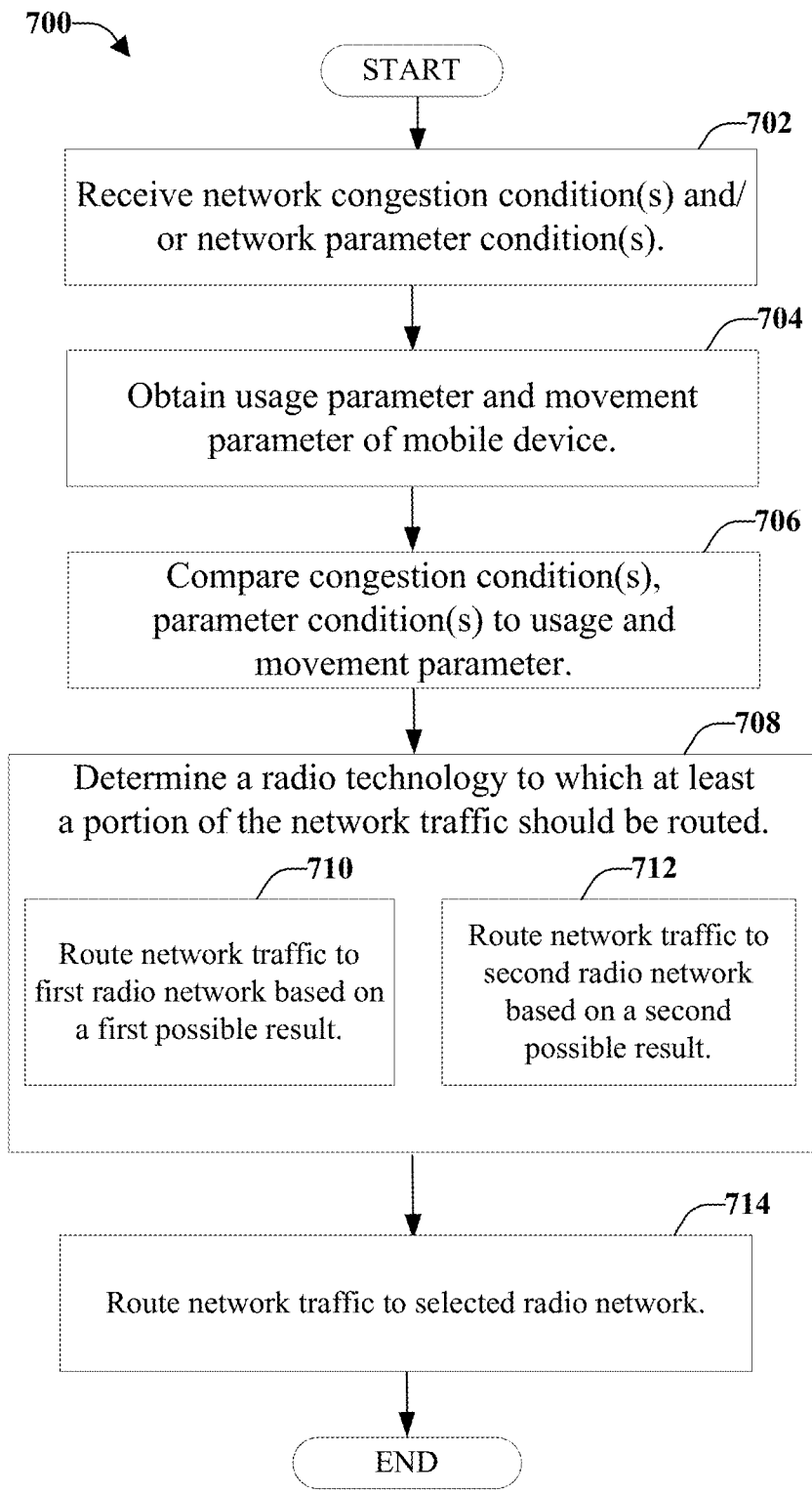
FIG. 7 illustrates an example, non-limiting method, according to an aspect.

FIG. 7 illustrates an example, non-limiting method 700, according to an aspect. At 702, a mobile device receives one or more network congestion conditions and one or more network parameter conditions related to a set of network devices associated with the one or more networks (e.g., using a receiver component 504). According to an implementation, a first set of network devices is a set of cellular enabled devices and a second set of network devices is a set of Wi-Fi network enabled devices.

A mobile device can request information related to various networks that are potential target networks. In another example, the information can be broadcast by the respective network and a mobile device within the communication range of the wireless network can obtain the information. Thus, the mobile device can receive a first network congestion condition and a first network parameter condition from a first set of network devices. Further, the mobile device can receive a second network congestion condition and a second network parameter condition from a set of network devices of a second network. The mobile device can also receive subsequent (e.g., third, fourth, and so on) network congestion conditions and subsequent parameter conditions from sets of network devices of the subsequent networks.

At 704, a usage parameter and a movement parameter of the mobile device are obtained (e.g., using the receiver component 504 or by the OS 320). The usage parameter of the mobile device can relate to an application currently executing on the mobile device. In another example, the usage parameter can relate to an application expected to be utilized by the mobile device. For example, based on historical information related to the usage of the mobile device, it might be determined that a similar application is expected to be used by the mobile device. The movement parameter might indicate that the device is stationary (e.g., not being moved). In another example, the movement parameter of the mobile device can relate to a speed at which the device is moving, or is expected to be moved based on historical or other information. The movement parameter can also relate to a direction to which the mobile device is moving, or is intended to be moved.

At 706, the network congestion conditions and parameter conditions are compared to the mobile device usage and movement pattern (e.g., using an evaluation manager component 206). For example, if the mobile device is moving in a particular direction, the network might be selected, at least in part, by the relative movement of the mobile device toward that network. Thus, according to an implementation, the comparison can include analyzing relative movement of the mobile device with respect to a first set of network devices and a second sect of network devices. In an aspect, the analyzing includes detecting a speed and a direction of the mobile device. According to another aspect, the analyzing includes detecting a vibration pattern of the mobile device.

At 708, a determination is made as to which radio technology at least a portion of the network traffic of the mobile device should be routed (e.g., using a selection manager component 208). For example, the determination can produce a first possible result or a second possible result. The first possible result can cause the network traffic of the mobile device to be routed to the first set of network devices, at 710. The second possible result can cause the network traffic of the mobile device to be routed to the second set of network devices, at 712. The network traffic is routed to the selected network, at 714 (e.g., using a routing manager component 210). Determining the network can include complying with a network selection policy, which can include analyzing a traffic routing rule of the network device that provides a service to the mobile device.

Figure 8:
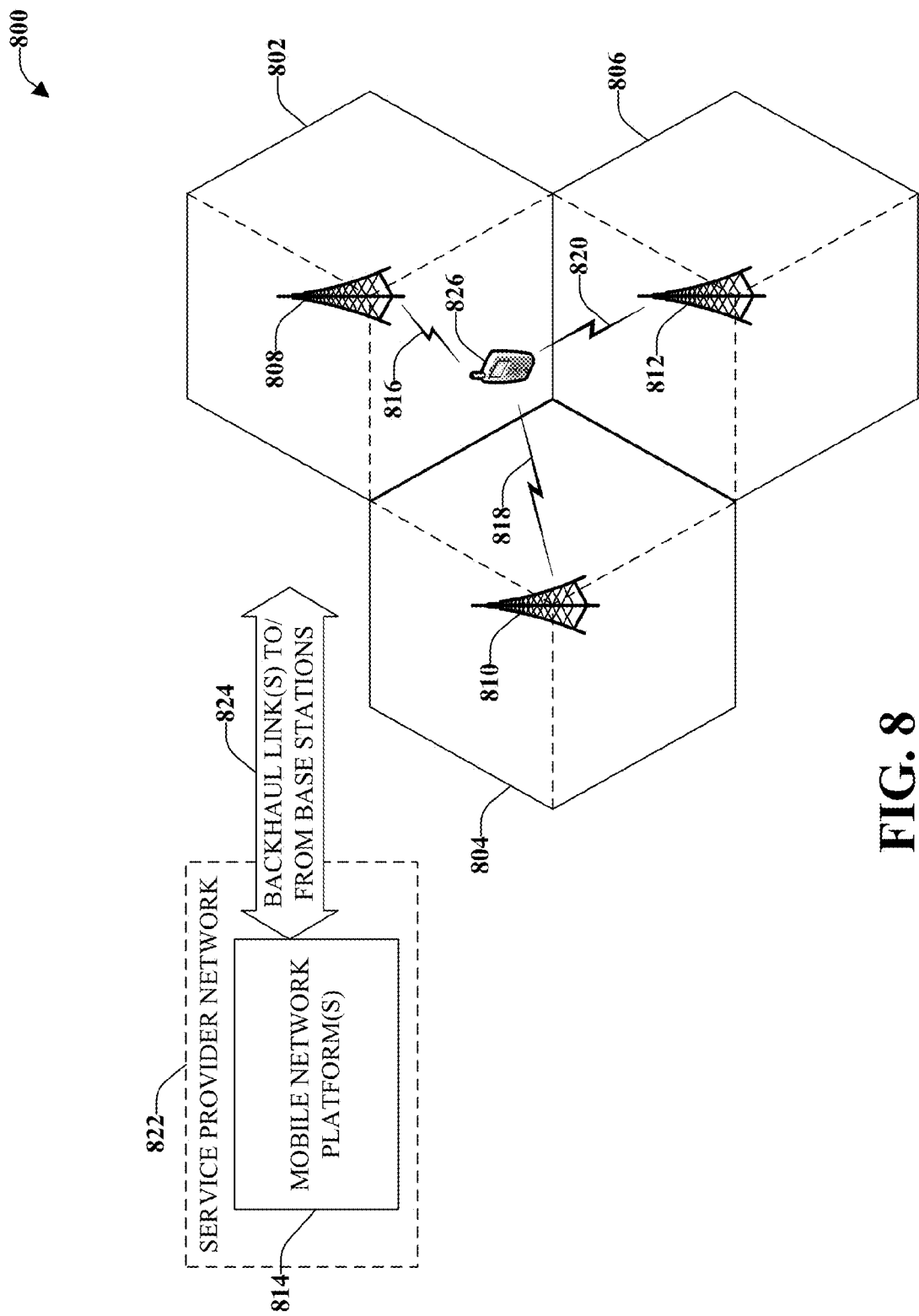
FIG. 8 is a schematic example wireless environment that can operate in accordance with aspects described herein.

By way of further description with respect to one or more non-limiting ways to facilitate network traffic routing selection, FIG. 8 is a schematic example wireless environment 800 that can operate in accordance with aspects described herein. In particular, example wireless environment 800 illustrates a set of wireless network macro cells. Three coverage macro cells 802, 804, and 806 include the illustrative wireless environment; however, it is noted that wireless cellular network deployments can encompass any number of macro cells. Coverage macro cells 802, 804, and 806 are illustrated as hexagons; however, coverage cells can adopt other geometries generally dictated by a deployment configuration or floor plan, geographic areas to be covered, and so on. Each macro cell 802, 804, and 806 is sectorized in a $2\pi/3$ configuration in which each macro cell includes three sectors, demarcated with dashed lines in FIG. 8. It is noted that other sectorizations are possible, and aspects or features of the disclosed subject matter can be exploited regardless of type of sectorization. Macro cells 802, 804, and 806 are served respectively through base stations or eNodeBs 808, 810, and 812. Any two eNodeBs can be considered an eNodeB site pair. It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 814, and set of base stations (e.g., eNode B 808, 810, and 812) that serve a set of macro cells; electronic circuitry or components associated with the base stations in the set of base stations; a set of respective wireless links (e.g., links 816, 818, and 820) operated in accordance to a radio technology through the base stations, form a macro radio access network. It is further noted that, based on network features, the radio controller can be distributed among the set of base stations or associated radio equipment. In an aspect, for universal mobile telecommunication system-based networks, wireless links 816, 818, and 820 embody a Uu interface (universal mobile telecommunication system Air Interface).

Mobile network platform(s) 814 facilitates circuit switched-based (e.g., voice and data) and packet-switched (e.g., Internet protocol, frame relay, or asynchronous transfer mode) traffic and signaling generation, as well as delivery and reception for networked telecommunication, in accordance with various radio technologies for disparate markets. Telecommunication is based at least in part on standardized protocols for communication determined by a radio technology utilized for communication. In addition, telecommunication can exploit various frequency bands, or carriers, which include any electromagnetic frequency bands licensed by the service provider network 822 (e.g., personal communication services, advanced wireless services, general wireless communications service, and so forth), and any unlicensed frequency bands currently available for telecommunication (e.g., the 2.4 GHz industrial, medical and scientific band or one or more of the 5 GHz set of bands). In addition, mobile network platform(s) 814 can control and manage base stations 808, 810, and 812 and radio component(s) associated thereof, in disparate macro cells 802, 804, and 806 by way of, for example, a wireless network management component (e.g., radio network controller(s), cellular gateway node(s), etc.). Moreover, wireless network platform(s) can integrate disparate networks (e.g., Wi-Fi network(s), femto cell network(s), broadband network(s), service network(s), enterprise network(s), and so on). In cellular wireless technologies (e.g., third generation partnership project universal mobile telecommunication system, global system for mobile communication, mobile network platform 814 can be embodied in the service provider network 822.

In addition, wireless backhaul link(s) 824 can include wired link components such as T1/E1 phone line; T3/DS3 line, a digital subscriber line either synchronous or asynchronous; an asymmetric digital subscriber line; an optical fiber backbone; a coaxial cable, etc.; and wireless link components such as line-of-sight or non-line-of-sight links which can include terrestrial air-interfaces or deep space links (e.g., satellite communication links for navigation). In an aspect, for universal mobile telecommunication system-based networks, wireless backhaul link(s) 824 embodies IuB interface.

It is noted that while exemplary wireless environment 800 is illustrated for macro cells and macro base stations, aspects, features and advantages of the disclosed subject matter can be implemented in micro cells, pico cells, femto cells, or the like, wherein base stations are embodied in home-based equipment related to access to a network.

Figure 9:
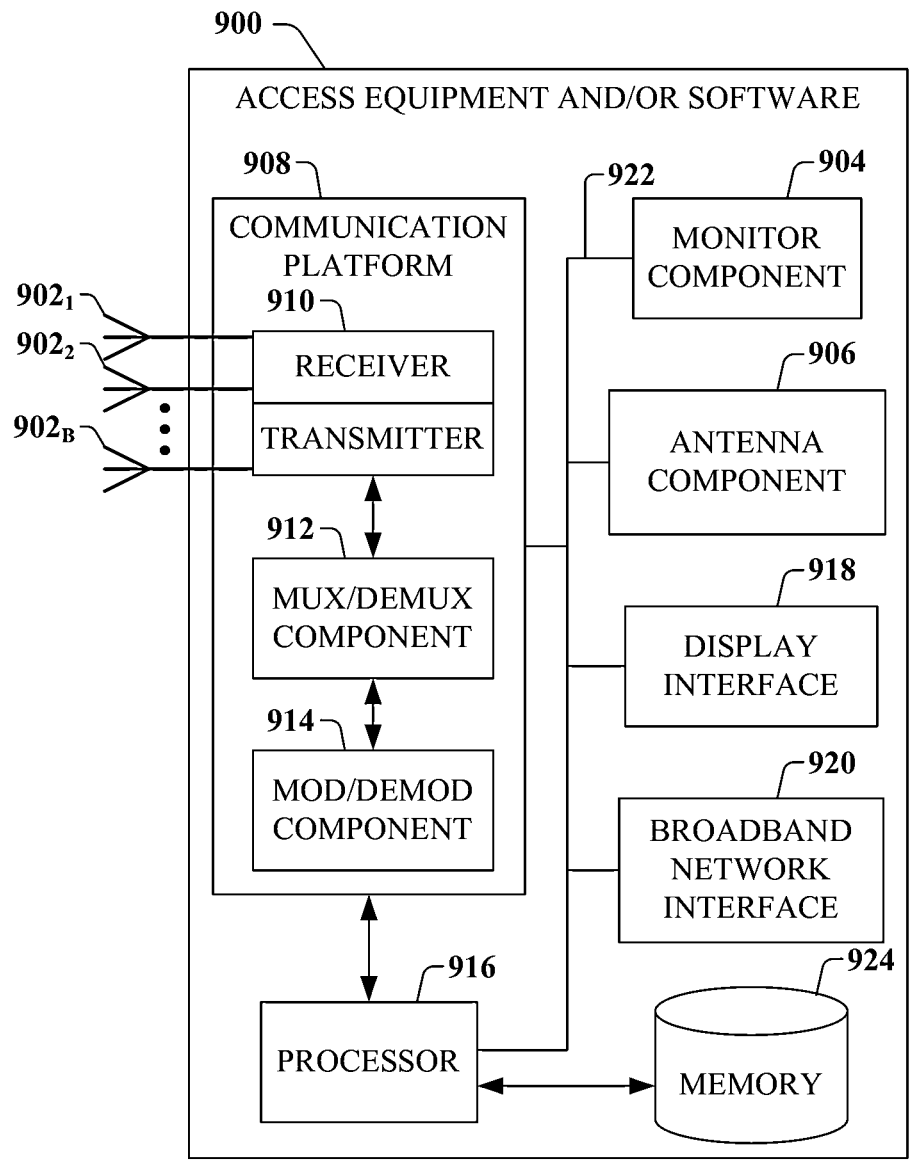
FIG. 9 illustrates a block diagram of access equipment and/or software related to access of a network, in accordance with an embodiment.

To provide further context for various aspects of the disclosed subject matter, FIG. 9 illustrates a block diagram of an embodiment of access equipment and/or software 900 related to access of a network (e.g., base station, wireless access point, femtocell access point, and so forth) that can enable and/or exploit features or aspects of the disclosed aspects.

Access equipment and/or software 900 related to access of a network can receive and transmit signal(s) from and to wireless devices, wireless ports, wireless routers, etc. through segments $902_1$-$902_B$ (B is a positive integer). Segments $902_1$-$902_B$ can be internal and/or external to access equipment and/or software 900 related to access of a network, and can be controlled by a monitor component 904 and an antenna component 906. Monitor component 904 and antenna component 906 can couple to communication platform 908, which can include electronic components and associated circuitry that provide for processing and manipulation of received signal(s) and other signal(s) to be transmitted.

In an aspect, communication platform 908 includes a receiver/transmitter 910 that can convert analog signals to digital signals upon reception of the analog signals, and can convert digital signals to analog signals upon transmission. In addition, receiver/transmitter 910 can divide a single data stream into multiple, parallel data streams, or perform the reciprocal operation. Coupled to receiver/transmitter 910 can be a multiplexer/demultiplexer 912 that can facilitate manipulation of signals in time and frequency space. Multiplexer/demultiplexer 912 can multiplex information (data/traffic and control/signaling) according to various multiplexing schemes such as time division multiplexing, frequency division multiplexing, orthogonal frequency division multiplexing, code division multiplexing, space division multiplexing. In addition, multiplexer/demultiplexer component 912 can scramble and spread information (e.g., codes, according to substantially any code known in the art, such as Hadamard-Walsh codes, Baker codes, Kasami codes, polyphase codes, and so forth).

A modulator/demodulator 914 is also a part of communication platform 908, and can modulate information according to multiple modulation techniques, such as frequency modulation, amplitude modulation (e.g., M-ary quadrature amplitude modulation, with M a positive integer); phase-shift keying; and so forth).

Access equipment and/or software 900 related to access of a network also includes a processor 916 configured to confer, at least in part, functionality to substantially any electronic component in access equipment and/or software 900. In particular, processor 916 can facilitate configuration of access equipment and/or software 900 through, for example, monitor component 904, antenna component 906, and one or more components therein. Additionally, access equipment and/or software 900 can include display interface 918, which can display functions that control functionality of access equipment and/or software 900, or reveal operation conditions thereof. In addition, display interface 918 can include a screen to convey information to an end user. In an aspect, display interface 918 can be a liquid crystal display, a plasma panel, a monolithic thin-film based electrochromic display, and so on. Moreover, display interface 918 can include a component (e.g., speaker) that facilitates communication of aural indicia, which can also be employed in connection with messages that convey operational instructions to an end user. Display interface 918 can also facilitate data entry (e.g., through a linked keypad or through touch gestures), which can cause access equipment and/or software 900 to receive external commands (e.g., restart operation).

Broadband network interface 920 facilitates connection of access equipment and/or software 900 to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 920 can be internal or external to access equipment and/or software 900, and can utilize display interface 918 for end-user interaction and status information delivery.

Processor 916 can be functionally connected to communication platform 908 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 916 can be functionally connected, through data, system, or an address bus 922, to display interface 918 and broadband network interface 920, to confer, at least in part, functionality to each of such components.

In access equipment and/or software 900, memory 924 can retain location and/or coverage area (e.g., macro sector, identifier(s)) access list(s) that authorize access to wireless coverage through access equipment and/or software 900, sector intelligence that can include ranking of coverage areas in the wireless environment of access equipment and/or software 900, radio link quality and strength associated therewith, or the like. Memory 924 also can store data structures, code instructions and program modules, system or device information, code sequences for scrambling, spreading and pilot transmission, access point configuration, and so on. Processor 916 can be coupled (e.g., through a memory bus), to memory 924 in order to store and retrieve information used to operate and/or confer functionality to the components, platform, and interface that reside within access equipment and/or software 900.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in memory 924, nonvolatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Figure 10:
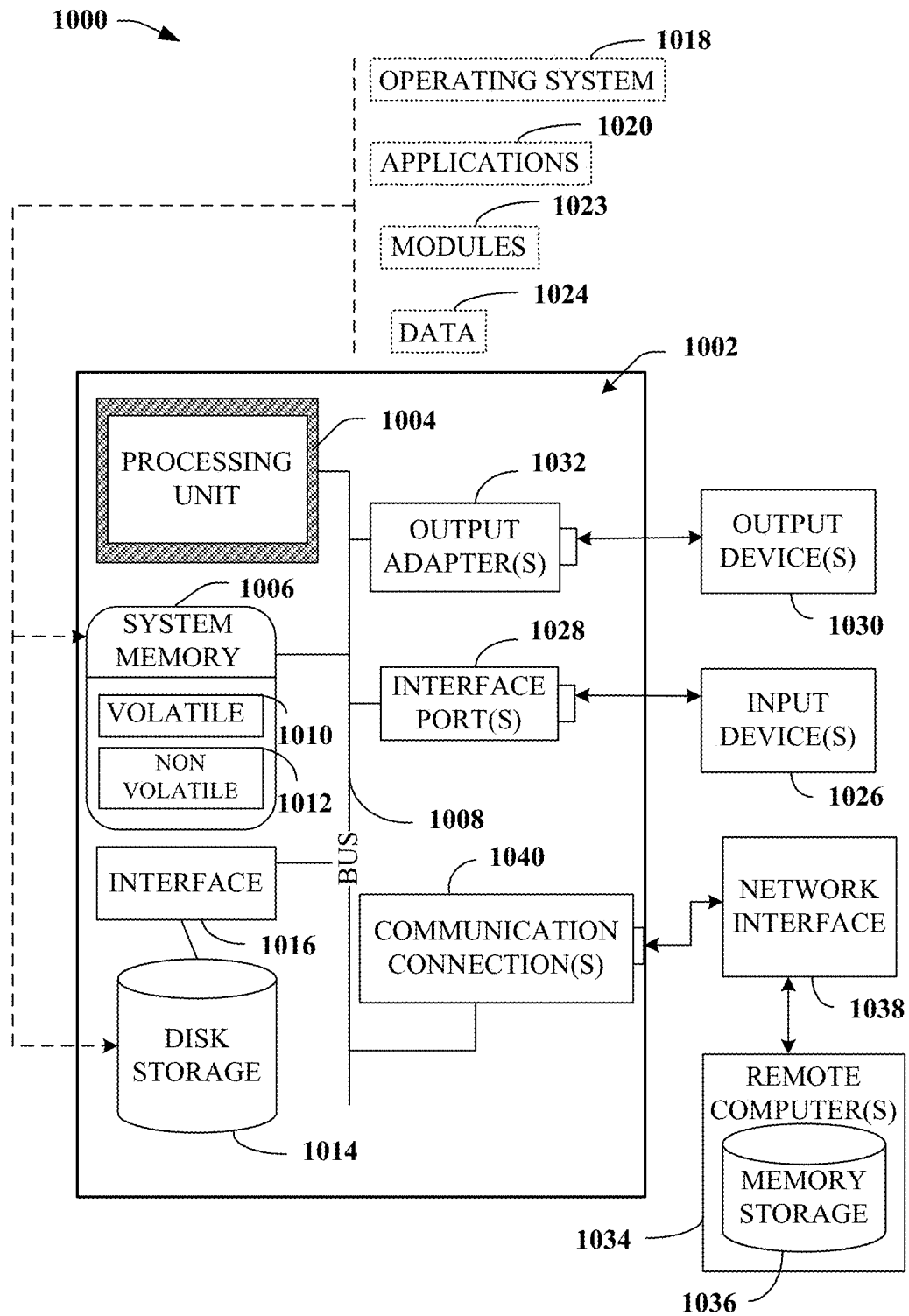
FIG. 10 illustrates a block diagram of a computing system, in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the various aspects also can be implemented in combination with other program modules. Generally, program modules include routines, programs, components, data structures, etc. that perform particular tasks and/or implement particular abstract data types. For example, in memory (such as at least one memory 202) there can be software, which can instruct a processor (such as at least one processor 204) to perform various actions. The processor can be configured to execute the instructions in order to implement the analysis of monitoring an uplink power level, detecting the uplink power level is at or above a threshold level, and/or disable transmission of at least one message as a result of the monitored uplink power level.

Moreover, those skilled in the art will understand that the various aspects can be practiced with other computer system configurations, including single-processor or multiprocessor computer systems, mini-computing devices, mainframe computers, as well as personal computers, base stations hand-held computing devices or user equipment, such as a tablet, phone, watch, and so forth, processor-based computers/systems, microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 10, a block diagram of a computing system 1000 operable to execute the disclosed systems and methods is illustrated, in accordance with an embodiment. Computer 1002 includes a processing unit 1004, a system memory 1006, and a system bus 1008. System bus 1008 couples system components including, but not limited to, system memory 1006 to processing unit 1004. Processing unit 1004 can be any of various available processors. Dual microprocessors and other multiprocessor architectures also can be employed as processing unit 1004.

System bus 1008 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (institute of electrical and electronics engineers 1194), and small computer systems interface.

System memory 1006 includes volatile memory 1010 and nonvolatile memory 1012. A basic input/output system, containing routines to transfer information between elements within computer 1002, such as during start-up, can be stored in nonvolatile memory 1012. By way of illustration, and not limitation, nonvolatile memory 1012 can include read only memory, programmable read only memory, electrically programmable read only memory, electrically erasable programmable read only memory, or flash memory. Volatile memory 1010 can include random access memory, which acts as external cache memory. By way of illustration and not limitation, random access memory is available in many forms such as dynamic random access memory, synchronous random access memory, synchronous dynamic random access memory, double data rate synchronous dynamic random access memory, enhanced synchronous dynamic random access memory, Synchlink dynamic random access memory, and direct Rambus random access memory, direct Rambus dynamic random access memory, and Rambus dynamic random access memory.

Computer 1002 also includes removable/non-removable, volatile/non-volatile computer storage media. In an implementation, provided is a non-transitory or tangible computer-readable medium storing executable instructions that, in response to execution, cause a system comprising a processor to perform operations. The operations can include comparing a first network congestion condition and a first network parameter condition received from a first set of network devices of a first network, and a second network congestion condition and a second network parameter condition received from a second set of network devices of a second network to a usage parameter and a movement parameter of a mobile device. The operations can also include determining a radio technology to which to route network traffic of the mobile device. Determining the routing of the network traffic can include, based on a first outcome of the comparing, determining to route the network traffic to the first set of network devices associated with a first radio technology. In another example, determining the routing of the network traffic can include, based on a second outcome of the comparing, determining to route the network traffic of the mobile device to the second set of network devices associated with a second radio technology. In an implementation, determining the set of network devices can include complying with a network selection policy received from a network device that provides a service to the mobile device. Further, the operations can include facilitating routing of the network traffic of the mobile device to the set of network devices.

In an implementation, the operations can include analyzing relative movement of the mobile device with respect to the first set of network devices and the second set of network devices. According to another implementation, the operations can include determining speed data representing a substantially current speed of the mobile device and direction data representing a substantially current direction of the mobile device.

FIG. 10 illustrates, for example, disk storage 1014. Disk storage 1014 includes, but is not limited to, devices such as a magnetic disk drive, floppy disk drive, tape drive, external or internal removable storage drives, superdisk drive, flash memory card, or memory stick. In addition, disk storage 1014 can include storage media separately or in combination with other storage media including, but not limited to, an optical disk drive such as a compact disk read only memory device, compact disk recordable drive, compact disk rewritable drive or a digital versatile disk read only memory drive. To facilitate connection of the disk storage 1014 to system bus 1008, a removable or non-removable interface is typically used, such as interface component 1016.

It is to be noted that FIG. 10 describes software that acts as an intermediary between users and computer resources described in suitable operating environment. Such software includes an operating system 1018. Operating system 1018, which can be stored on disk storage 1014, acts to control and allocate resources of computer system 1002. System applications 1020 can take advantage of the management of resources by operating system 1018 through program modules 1022 and program data 1024 stored either in system memory 1006 or on disk storage 1014. It is to be understood that the disclosed subject matter can be implemented with various operating systems or combinations of operating systems.

A user can enter commands or information, for example through interface component 1016, into computer system 1002 through input device(s) 1026. Input devices 1026 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1004 through system bus 1008 through interface port(s) 1028. Interface port(s) 1028 include, for example, a serial port, a parallel port, a game port, and a universal serial bus. Output device(s) 1030 use some of the same type of ports as input device(s) 1026.

Thus, for example, a universal serial bus port can be used to provide input to computer 1002 and to output information from computer 1002 to an output device 1030. Output adapter 1032 is provided to illustrate that there are some output devices 1030, such as monitors, speakers, and printers, among other output devices 1030, which use special adapters. Output adapters 1032 include, by way of illustration and not limitation, video and sound cards that provide means of connection between output device 1030 and system bus 1008. It is also noted that other devices and/or systems of devices provide both input and output capabilities such as remote computer(s) 1034.

Computer 1002 can operate in a networked environment using logical connections to one or more remote computers, such as remote computer(s) 1034. Remote computer(s) 1034 can be a personal computer, a server, a router, a network computer, a workstation, a microprocessor based appliance, a peer device, or other common network node and the like, and typically includes many or all of the elements described relative to computer 1002.

For purposes of brevity, only one memory storage device 1036 is illustrated with remote computer(s) 1034. Remote computer(s) 1034 is logically connected to computer 1002 through a network interface 1038 and then physically connected through communication connection 1040. Network interface 1038 encompasses wire and/or wireless communication networks such as local area networks and wide area networks. Local area network technologies include fiber distributed data interface, copper distributed data interface, Ethernet, token ring and the like. Wide area network technologies include, but are not limited to, point-to-point links, circuit switching networks, such as integrated services digital networks and variations thereon, packet switching networks, and digital subscriber lines.

Communication connection(s) 1040 refer(s) to hardware/software employed to connect network interface 1038 to system bus 1008. While communication connection 1040 is shown for illustrative clarity inside computer 1002, it can also be external to computer 1002. The hardware/software for connection to network interface 1038 can include, for example, internal and external technologies such as modems, including regular telephone grade modems, cable modems and DSL modems, ISDN adapters, and Ethernet cards.

It is to be noted that aspects, features, or advantages of the aspects described in the subject specification can be exploited in substantially any communication technology. For example, 4G technologies, Wi-Fi, worldwide interoperability for microwave access, Enhanced gateway general packet radio service, third generation partnership project long term evolution, third generation partnership project 2 ultra mobile broadband, third generation partnership project universal mobile telecommunication system, high speed packet access, high-speed downlink packet access, high-speed uplink packet access, global system for mobile communication edge radio access network, universal mobile telecommunication system terrestrial radio access network, long term evolution advanced. Additionally, substantially all aspects disclosed herein can be exploited in legacy telecommunication technologies; e.g., global system for mobile communication. In addition, mobile as well non-mobile networks (e.g., Internet, data service network such as Internet protocol television) can exploit aspect or features described herein.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Other combinations of hardware and software or hardware and firmware can enable or implement aspects described herein, including the disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc, digital versatile disc, blu-ray disc . . . ), smart cards, and flash memory devices (e.g., card, stick, key drive . . . ).

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory, read only memory, electrically erasable programmable read only memory, flash memory or other memory technology, compact disk read only memory, digital versatile disk or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the one or more aspects. It is, of course, not possible to describe every conceivable combination of components or methods for purposes of describing the aspects, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output components as well as associated processor, application, or application programming interface components.

The term "set", "subset", or the like as employed herein excludes the empty set (e.g., the set with no elements therein). Thus, a "set", "subset", or the like includes one or more elements or periods, for example. As an illustration, a set of periods includes one or more periods; a set of transmissions includes one or more transmissions; a set of resources includes one or more resources; a set of messages includes one or more messages, and so forth.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A method, comprising:
 comparing, by a mobile device comprising a processor, a first network congestion condition and a first network parameter condition received from a first set of network devices of a first network, and a second network congestion condition and a second network parameter condition received from a second set of network devices of a second network, to a usage parameter and a movement parameter of the mobile device;

determining, by the mobile device, a radio technology to select for use in routing network traffic of the mobile device, wherein determining the radio technology comprises:

based on a first result of the comparing, determining, by the mobile device, to route at least a portion of the network traffic of the mobile device to the first set of network devices associated with a first radio technology, or based on a second result of the comparing, determining, by the mobile device, to route at least the portion of the network traffic of the mobile device to the second set of network devices associated with a second radio technology, wherein determining the radio technology further comprises complying with a network selection policy received from a network device that provides a service to the mobile device; and initiating, by the mobile device, routing of the network traffic of the mobile device either to the first set of network devices or to the second set of network devices.

2. The method of claim 1, wherein the comparing comprises analyzing relative movement of the mobile device with respect to the first set of network devices and the second set of network devices.

3. The method of claim 2, wherein the analyzing comprises detecting a speed and a direction of the mobile device.

4. The method of claim 2, wherein the analyzing comprises detecting a vibration pattern of the mobile device.

5. The method of claim 1, wherein the first set of network devices is a set of cellular network enabled devices and the second set of network devices is a set of Wi-Fi network enabled devices.

6. The method of claim 1, wherein the complying with the network selection policy comprises analyzing a traffic routing rule of the network device that provides the service to the mobile device.

7. The method of claim 6, further comprising receiving an access network discovery and selection policy from an access network discovery and selection function server of a serving network, wherein the access network discovery and selection policy comprises logic used by the mobile device to select the network.

8. The method of claim 1, wherein the comparing comprises analyzing a user preference associated with selection of the first set of network devices or the second set of network devices.

9. The method of claim 1, wherein the comparing comprises analyzing respective basic service set load conditions of the first set of network devices and the second set of network devices.

10. The method of claim 1, wherein the comparing comprises evaluating data representative of a battery usage level of the mobile device.

11. A computer-readable storage device storing executable instructions that, in response to execution, cause a system comprising a processor to perform operations, comprising:

comparing a first network congestion condition and a first network parameter condition received from a first set of network devices of a first network, and a second network congestion condition and a second network parameter condition received from a second set of network devices of a second network, to a usage parameter and a movement parameter of a mobile device;

determining a radio technology to select for use in routing network traffic of the mobile device, wherein determining the radio technology comprises:

based on a first result of the comparing, determining to route the network traffic to the first set of network devices associated with a first radio technology, or based on a second result of the comparing, determining to route the network traffic of the mobile device to the second set of network devices associated with a second radio technology, wherein determining the radio technology further comprises complying with a network selection policy received from a network device that provides a service to the mobile device; and facilitating routing of the network traffic of the mobile device either to the first set of network devices or to the second set of network devices.

12. The computer-readable storage device of claim 11, wherein the operations further comprise analyzing relative movement of the mobile device with respect to the first set of network devices and the second set of network devices.

13. The computer-readable storage device of claim 11, wherein the operations further comprise determining speed data representing a substantially current speed of the mobile device and direction data representing a substantially current direction of the mobile device.

14. A mobile device, comprising:

a processor; and a memory that stores instructions that, in response to execution, cause the processor to perform operations, comprising comparing a first network congestion condition and a first network parameter condition received from a first set of network devices of a first network, and a second network congestion condition and a second network parameter condition received from a second set of network devices of a second network, to a usage parameter and a movement parameter of a mobile device, determining a radio technology to select for use in routing network traffic of the mobile device, wherein determining the radio technology comprises based on a first result of the comparing, determining to route the network traffic to the first set of network devices associated with a first radio technology, or based on a second result of the comparing, determining to route the network traffic of the mobile device to the second set of network devices associated with a second radio technology, wherein determining the set of network devices further comprises complying with a network selection policy received from a network device that provides a service to the mobile device; and facilitating routing of the network traffic of the mobile device either to the first set of network devices or to the second set of network devices.

15. The mobile device of claim 14, wherein the comparing comprises analyzing relative movement of the mobile device with respect to the first set of network devices and the second set of network devices.

16. The mobile device of claim 15, wherein the analyzing comprises detecting a speed and a direction of the mobile device.

17. The mobile device of claim 15, wherein the analyzing comprises detecting a vibration pattern of the mobile device.

18. The mobile device of claim 14, wherein the complying with the network selection policy comprises analyzing a traffic routing rule of the network device that provides the service to the mobile device.

19. The mobile device of claim 18, wherein the operations further comprise receiving an access network discovery and selection policy from an access network discovery and selection function server of a serving network, wherein the access network discovery and selection policy comprises logic used by the mobile device to select the network.

20. The mobile device of claim 14, wherein the comparing comprises analyzing respective basic service set load conditions of the first set of network devices and the second set of network devices.

* * * * *